United States Patent
Perry et al.

(10) Patent No.: US 11,966,955 B1
(45) Date of Patent: Apr. 23, 2024

(54) METHODS AND APPARATUSES FOR GENERATING A MANUFACTURING QUOTE

(71) Applicant: PROTOLABS, INC., Maple Plain, MN (US)

(72) Inventors: Austin Perry, Maple Plain, MN (US); Joshua Knutson, Maple Plain, MN (US); Robert Ford, Maple Plain, MN (US); Samuel Bosak, Maple Plain, MN (US); Shuji Usui, Maple Plain, MN (US)

(73) Assignee: Proto Labs, Inc., Maple Plain, MN (US)

( * ) Notice: Subject to any disclaimer, the term of this patent is extended or adjusted under 35 U.S.C. 154(b) by 0 days.

(21) Appl. No.: 18/208,195

(22) Filed: Jun. 9, 2023

(51) Int. Cl.
*G06Q 30/02* (2023.01)
*G06Q 30/0283* (2023.01)
*G06Q 50/04* (2012.01)

(52) U.S. Cl.
CPC ......... *G06Q 30/0283* (2013.01); *G06Q 50/04* (2013.01)

(58) Field of Classification Search
CPC ............... G06Q 30/0283; G06Q 50/04; G06Q 30/0635; G06Q 10/087; G06F 30/30; G06F 30/17; G06F 30/20; G05B 19/4207; G05B 19/4065
USPC ..................................... 705/400, 26.4; 703/7
See application file for complete search history.

(56) References Cited

U.S. PATENT DOCUMENTS

| | | | | |
|---|---|---|---|---|
| 6,470,228 | B1* | 10/2002 | Turner | G06Q 10/087 700/98 |
| 2007/0038531 | A1* | 2/2007 | Lukis | G06Q 50/04 705/26.4 |
| 2015/0127139 | A1* | 5/2015 | Bolin | G05B 19/4065 700/173 |
| 2021/0004369 | A1 | 1/2021 | Jones | |
| 2021/0034961 | A1* | 2/2021 | Lovell | G05B 19/4207 |
| 2022/0107621 | A1 | 4/2022 | Schwartz | |
| 2022/0156434 | A1 | 5/2022 | Razzell | |
| 2022/0214666 | A1 | 7/2022 | King | |
| 2022/0214668 | A1* | 7/2022 | King | G06F 30/20 |
| 2022/0414293 | A1* | 12/2022 | Guo | G06F 30/17 |

FOREIGN PATENT DOCUMENTS

DE 112017006552 T5 * 8/2020 ....... G05B 19/40932

OTHER PUBLICATIONS

"How the Cost of CNC Machining is Estimated", Sep. 16, 2019; randrmanufacturing.com, 2 pages (Year: 2019).*

(Continued)

*Primary Examiner* — Shannon S Campbell
*Assistant Examiner* — Freda A Nelson
(74) *Attorney, Agent, or Firm* — Caldwell Intellectual Property Law

(57) ABSTRACT

Apparatuses and methods for generating a manufacturing quote are provided. Part data for a part to be manufactured is received by a processor, where the part information includes information defining the part or specifying one or more aspects of the part. A model of the part is generated and at least a toolpath to create the part is generated. A manufacturing quote is generated using the model of the part. Feedback regarding part design may be provided and manufacturing of the part may be initiated.

18 Claims, 6 Drawing Sheets

(56) References Cited

OTHER PUBLICATIONS

Bryan Rosenberger, "How the Cost of CNC Machining is Estimated", Sep. 16, 2019; randrmanufacturing.com, 2 pages (Year: 2019).*

Y Xin et al. "A tool path optimization approach based on blend feature simplification for multi-cavity machining of complex parts", Science Progress Jan.-Mar. 2020, 22 pages (Year: 2020).*

* cited by examiner

METHODS AND APPARATUSES FOR GENERATING A MANUFACTURING QUOTE

FIELD OF THE INVENTION

The present invention generally relates to the field of manufacturing. In particular, the present invention is directed to methods and apparatuses for generating a manufacturing quote.

BACKGROUND

Manufacturing facilities such as machine shops endeavor to provide thorough and fast service to their customers, and the computer age has allowed continually improved methods for customers to generate models of parts that they wish to have manufactured. However, customers frequently have varying skill levels and engineering knowledge and therefore are prone to make mistakes or inefficient design decisions when creating models of parts they wish to have manufactured. There is currently an unmet need for a solution to provide a customer or user with efficiently and quickly generated quotes for parts submitted to a manufacturing facility.

SUMMARY OF THE DISCLOSURE

In an aspect, an apparatus for generating a manufacturing quote is provided. The apparatus comprises a processor and a memory configured to receive part data from an entity, the part data corresponding to a part. The processor is further configured to correlate one or more variations of the part data with an improvement to a manufacturability datum. The processor is further configured to select at least one of the one or more variations of the part data based on the manufacturability datum to create optimized part data. The processor is further configured to generate an optimized model of the part based on the optimized part data and an optimized toolpath based on the optimized part data, wherein the optimized toolpath corresponds to a first tool used to manufacture the part. The processor is further configured to generate a quote for manufacturing of the part based on the optimized toolpath, wherein the quote includes a time of receipt of the manufactured part.

In another aspect, a method for generating a manufacturing quote is provided. The method comprises the steps of receiving, by a processor, part data from an entity, the part data corresponding to a part. The method further comprises the steps of correlating, by the processor, one or more variations of the part data with an improvement to a manufacturability datum. The method further comprises the steps of selecting, by the processor, at least one of the one or more variations of the part data based on the manufacturability datum to create optimized part data. The method further comprises the steps of generating, by the processor, an optimized model of the part based on the optimized part data and an optimized toolpath based on the optimized part data, wherein the optimized toolpath corresponds to a first tool used to manufacture the part. The method further comprises the steps of generating, by the processor, a quote for manufacturing of the part based on the optimized toolpath, wherein the quote includes a time of receipt of the manufactured part.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a manufacturing quote. When a user or customer wishes to have a part manufactured, for instance at a machine shop, the user must submit designs, models, or drawings that completely define the part and the manufacturing facility generates a quote to inform the customer how much the part will likely cost to manufacture. However, users or customers are frequently left without an understanding of how long the part will take to complete. Aspects of the present disclosure can automatically generate quotes that may include a time to manufacture or receive a part as well as a potential cost.

Figure 1:
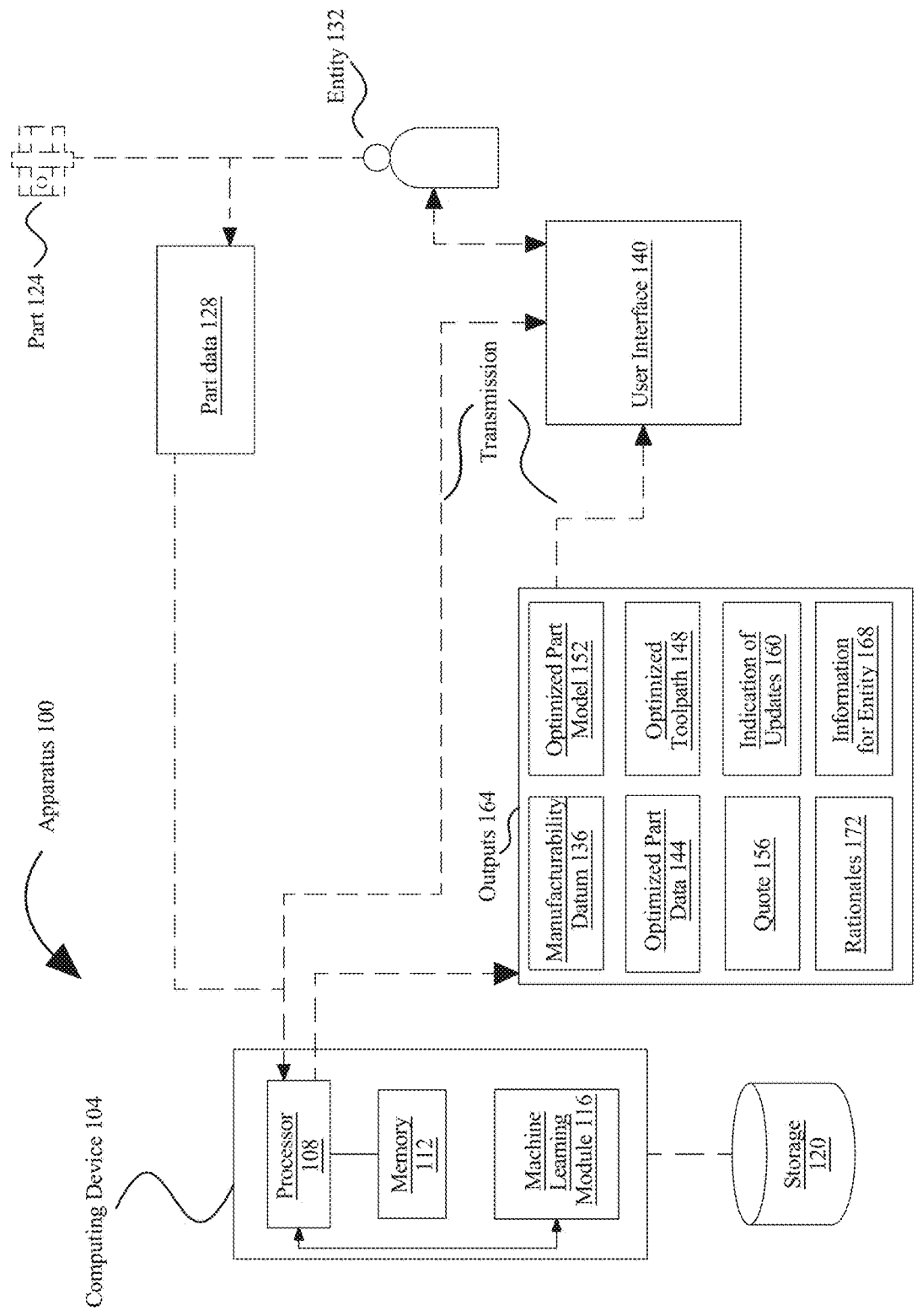
FIG. 1 is a block diagram of an apparatus for generating a manufacturing quote in accordance with the disclosure.

Referring now to FIG. 1, an exemplary embodiment of an apparatus 100 for generating a manufacturing quote is illustrated. Apparatus 100 includes a computing device 104. Apparatus 100 includes a processor. Processor may include, without limitation, any processor described in this disclosure. Processor may be included in a computing device. Computing device 104 may include any computing device as described in this disclosure, including without limitation a microcontroller, microprocessor, digital signal processor (DSP) and/or system on a chip (SoC) as described in this disclosure. Computing device 104 includes processor 108, memory 112, machine learning module 116. Computing device may be communicatively coupled to storage 120. Storage may be any memory described in accordance with the invention including cloud storage, solid state memory, hard disk drives, server storage, or any data storage. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 108 may be communicatively connected to memory 112. Memory 112 may contain instructions used to configure processor 108 to perform tasks as described throughout this disclosure. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 108 is configured to receive part data 128, the part data 128 corresponding to a part 124, from an entity 132. "Part data" as used herein is defined as an element or elements of information related to part 124. "Data" as used herein, may mean plural elements of information or a single element of information. An "entity," as used herein, means anyone or anything that might provide information, including a person, group of people, company, corporation, business, juristic entity, computer program, user, database, AI, algorithm, mathematical model, and the like. Part data 128 may specify parameters defining part 124 including dimensions and tolerances of part 124. Part data 128 may include a part model of the part 124. A "part model," as used in this disclosure, is a description, illustration, two-dimensional model, three-dimensional model, computer-aided design (CAD) model, CAD drawing, computer-aided machining (CAM) model, engineering drawing, sketch, group of dimensions, surface mesh, coordinates, or anything that shows or otherwise defines a part. A part may be created by any manufacturing process as described in the entirety of this disclosure. A part may include any item made of materials such as metals including, for example, aluminum, steel, titanium, metal alloys, brass, and the like; plastics, such as nylon, acrylic, ABS, Delrin, polycarbonate, and the like; foam, composites, wood, etc. Part data 128 may include a print. A print may include tolerance data indicating one or more manufacturing tolerances required for dimensions defining the part. In an exemplary embodiment, part data 128 may include one or more of a three-dimensional computer-aided design (CAD) model of the part, a two-dimensional engineering drawing of the part, a bill of materials, a material specification for the part, and other information relating to part 124. As used in this disclosure, "two-dimensional" means having, appearing to have, or displaying two out of the three dimensions of length, width, and height. As used in this disclosure, "three-dimensional" means having, appearing to have, or displaying all three out of the three dimensions of length, width, and height. As used herein, a "print" is defined as any two-dimensional depiction of part 124. Such two-dimensional prints may include any data describing the part 124 such as dimensions and tolerances.

With continued reference to FIG. 1, "tolerance," as used herein, is defined as the permissible limit or limits of variation between a desired or design dimension that defines a feature of a part and the actual value or range of values of the dimension of the feature once the part has been manufactured. "Manufacture," as used herein, is defined as creating, making, or producing an object such as a part. Tolerances may be described in terms of fit such as clearance fit, an interference fit, driving fit, forced fit, similar fit, fixed fit, loose running fit, free running fit, close running fit, sliding fit, location fit, and the like. As is known in the art, design specifications such as CAD models include tolerances because it is not possible to manufacture a real object such that the object has the perfect dimensions specified in such a CAD model. For example, imperfections such as dulling or chipping of cutting tools, slight variations in tool sizing, measurement or calibration errors, operator error, and the like, mean that actual dimensions of the manufactured part will always vary to some degree from the corresponding dimensions specified in the design specifications. If the variations are small enough, the part can be used as designed with no or negligible impact on the function of the part. The maximum allowable variation for a dimension is specified by a corresponding tolerance. Variations in tolerance values may have associated manufacturing tradeoffs. For example, a feature manufactured using an end mill may have a standard tolerance of ±0.2 mm for a dimension of 10 mm. It may be possible for a manufacturing facility to machine the feature using an end mill with a tolerance as low as ±0.01 mm; however, this might require additional machining and/or setup time, a more expensive end mill, additional machinist labor, or similar increase in work that may have a corresponding undesirable effect such as increased cost, longer lead time, or lower throughput. Further, different manufacturing techniques will have different possible tolerances, which can result in required tradeoffs such as those outlined above. For example, a manufacturing facility may be able to machine a feature with a smallest possible tolerance of 0.01 mm using a mill such as an end mill but may be able to machine the same feature with a smallest possible tolerance of 0.005 mm using a wire electrical discharge machining (EDM) tool. Using these different methods will typically also involve tradeoffs such as differences in features that are possible to make, required machining time, manufacturing cost, and the like. A purpose of the present invention is to automatically provide a user with feedback on a submitted part design regarding selected tolerances and manufacturing methods, including potentially educating the user on what rationales are typically considered in the selection of tolerances or manufacturing methods.

With continued reference to FIG. 1, tolerance data may include any data describing and/or identifying a geometric tolerance of the part to be manufactured. The geometric tolerance may include a form tolerance, an orientation tolerance, location tolerance, a run-out tolerance, and the like. The tolerance data may be included in the prints of the part 124 as symbols, text, embedded information, and the like. Extracting the tolerance data may be performed utilizing a machine-learning process. Part data may include geometric dimensioning and tolerancing (GD&T) information, which may be provided in one or more software files such as DXF files, DWG files, PDF files, and/or the like.

With continued reference to FIG. 1, a part model may further include semantic information of the part to be manufactured. "Semantic information," as described in this disclosure, is data concerning and/or describing product and manufacturing information (PMI) and product life cycle management (PLM). PMI, as used in this disclosure, is data describing non-geometric attributes of a model of a part to be manufactured, such as the representative part model of a part model, necessary for manufacturing the part, components of the part, and associated assemblies. For example, and without limitation, PMI may include geometric dimensions and tolerances (GD&T), 3D annotation and dimensions, surface roughness, surface finish, material specifications, and the like. In some embodiments, PMI may include details about the machinability of the part to be manufactured. PMI may include textual data, such as alphanumeric, punctuation, typographical symbols, character, string data, and/or any textual data as described in the entirety of this disclosure. PLM, as used in this disclosure, is any data concerning and/or describing management of the lifecycle of the part from inception, through engineering design and manufacture, to service and disposal of the manufactured part. PLM may include textual data, such as alphanumeric, punctuation, typographical symbols, character, string data, and/or any textual data as described in the entirety of this disclosure. In an embodiment, semantic information included in a part model may be used in processes for generating a manufacturing quote for a part to be manufactured. Semantic information may be implemented without limitation as described in U.S. patent application Ser. No. 17/698,119 filed on Mar. 18, 2022 and entitled "APPARATUSES AND METHODS FOR SUPERIMPOSITION OF A CROSS-SECTIONAL DRAWING OVER A THREE-DIMENSIONAL MODEL," the entirety of which is incorporated herein by reference.

With continued reference to FIG. 1, part data 128 may further include a model with a plurality of perspective views of the part 124. A model may further include any data describing and/or relating to a representative part model of a part to be manufactured. A CAD model in accordance with this disclosure may be created using CAD software. For example and without limitation, CAD software may include SOLIDWORKS® software and/or CATIA software (available from Dassault Systemes SolidWorks Corp, Waltham, Massachusetts), AUTOCAD® software and/or Fusion software (available from Autodesk, Inc., San Rafael, California), PTC Creo software (available from PTC, Inc., Boston, Massachusetts), Siemens NX software (available from Siemens PLM Software, Plano, Texas) and MICROSTATION® software (available from Bentley Systems, Inc., Exton, Pennsylvania), and the like. The representative part model may include any modeling type, such as, without limitation, a wireframe, solid model and/or any combination thereof. The representative part model may be saved in a computer file using any suitable file protocol, such as, without limitation, SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (IGS) and/or the like. The representative part model further includes information about the geometry and/or other defining properties of the mechanical part's structure. The representative part model may include a polygon mesh, such as a collection of vertices, edges, and faces, that define the shape of a representative part model. For example and without limitation, the faces of the polygon mesh may include triangles, such as a triangle mesh, quadrilaterals, or other simple convex polygons.

With continued reference to FIG. 1, a part model included in part data 128 may include a plurality of perspective views of part 124. Each view of a plurality of views, as used in this disclosure, may include a view of part 124 from a plane orthogonal to an axis passing through an origin of part 124. As a non-limiting example, the axis may be part of a three-axis coordinate system, such as the x-axis, y-axis, and z-axis; or abscissa, ordinate, and applicate. The axis may include, as a further non-limiting example, any axis as a function of the origin. Persons skilled in the art, upon reviewing the entirety of this disclosure, will be aware of axes which may be suitable for use with each side of the plurality of sides consistently with this disclosure. The origin of a part model, as described herein, is a fixed point of reference for the part model. For example, and without limitation, the origin may include the center of mass, the geometric center, the center of a feature of the part, wherein a feature may be a hole, a well, a groove, a pocket, a channel, extruded volume, and the like. As a further example and without limitation, the origin may include any position of the part.

With continued reference to FIG. 1, manufacturing processes used in accordance with this disclosure may include subtractive manufacturing processes, which produces the product by removing material from a workpiece. "Workpiece," as used herein, is defined as the constituent material from which the final part will be produced in a subtractive manufacturing process or constituent material to which further material is added in an additive manufacturing process. The removal of material may be accomplished using abrasives, cutting tools or endmills, laser cutting, water jet, plasma cutter, chemical etching or ablation, removal using heat, or any other method that removes material from the workpiece. Each subtractive manufacturing process used may be any suitable process, such as, but not limited to, rotary-tool milling, electronic discharge machining, ablation, etching, erosion, cutting, and cleaving, among others. If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In some embodiments, the milling equipment used for removing material may be of the computerized numerical control (CNC) type that is automated and operates by precisely programmed commands that control movement of one or more parts of the equipment to effect the material removal. CNC mills may operate in several axes as is known in the art; for example, a 3-axis, 4-axis, 5-axis, or 6-axis CNC mill. CNC machines, their operation, programming, and relation to CAM tools and CAD tools are well known and need not be described in detail herein for those skilled in the art to understand the scope of the present invention and how to practice it in any of its widely varying forms.

With continued reference to FIG. 1, manufacturing processes used in accordance with this disclosure may include using spark-erosive devices; for instance, subtractive manufacturing may include removal of material using electronic discharge machining (EDM). EDM may include wire EDM, plunge EDM, immersive EDM, ram EDM, or any other EDM manufacturing technique. Subtractive manufacturing may be performed using laser-cutting processes. Subtractive manufacturing may be performed using water-jet or other fluid-jet cutting techniques. Fundamentally, any process for removal of material may be employed for subtractive manufacturing.

With continued reference to FIG. 1, manufacturing processes used in accordance with this disclosure may include lathes, saws, water jets, presses such as drill presses, grinders, and other equipment.

With continued reference to FIG. 1, manufacturing processes used in accordance with this disclosure may include an additive manufacturing process, in which material is deposited on the workpiece. In some embodiments, an additive manufacturing process is a process in which material is added incrementally to a body of material in a series of two or more successive steps. The material may be added in the form of a stack of incremental layers; each layer may represent a cross-section of the object to be formed upon completion of the additive manufacturing process. Each cross-section may, as a non-limiting example be modeled on a computing device as a cross-section of graphical representation of the object to be formed; for instance, a computer aided design (CAD) tool may be used to receive or generate a three-dimensional model of the object to be formed, and a computerized process may derive from that model a series of cross-sectional layers that, when deposited during the additive manufacturing process, together will form the object. The steps performed by an additive manufacturing system to deposit each layer may be guided by a computer aided manufacturing (CAM) tool. In other embodiments, a series of layers are deposited in a substantially radial form, for instance by adding a succession of coatings to the workpiece. Similarly, the material may be added in volumetric increments other than layers, such as by depositing physical voxels in rectilinear or other forms. Additive manufacturing, as used in this disclosure, may specifically include manufacturing done at the atomic and nano level. Additive manufacturing also includes bodies of material that are a hybrid of other types of manufacturing processes, e.g. forging and additive manufacturing as described above. As an example, a forged body of material may have welded material deposited upon it which then comprises an additive manufactured body of material.

With continued reference to FIG. 1, deposition of material in additive manufacturing process may be accomplished by any suitable means. Deposition may be accomplished using stereolithography, in which successive layers of polymer material are deposited and then caused to bind with previous layers using a curing process such as curing using ultraviolet light. Additive manufacturing processes may include "three-dimensional printing" processes that deposit successive layers of power and binder; the powder may include polymer or ceramic powder, and the binder may cause the powder to adhere, fuse, or otherwise join into a layer of material making up the body of material or product. Additive manufacturing may include metal three-dimensional printing techniques such as laser sintering including direct metal laser sintering (DMLS) or laser powder-bed fusion. Likewise, additive manufacturing may be accomplished by immersion in a solution that deposits layers of material on the body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing or combine two or more methods. Companies producing additive manufacturing equipment include 3D Systems, Stratasys, Formlabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

With continued reference to FIG. 1, additive manufacturing may include deposition of initial layers on a substrate. Substrate may include, without limitation, a support surface of an additive manufacturing device, or a removable item placed thereon. Substrate may include a base plate, which may be constructed of any suitable material; in some embodiments, where metal additive manufacturing is used, base plate may be constructed of metal, such as titanium. Base plate may be removable. One or more support features may also be used to support additively manufactured body of material during additive manufacture; for instance and without limitation, where a downward-facing surface of additively manufactured body of material is constructed having less than a threshold angle of steepness, support structures may be necessary to support the downward-facing surface; threshold angle may be, for instance 45 degrees. Support structures may be additively constructed and may be supported on support surface and/or on upward-facing surfaces of additively manufactured body of material. Support structures may have any suitable form, including struts, buttresses, mesh, honeycomb or the like; persons skilled in the art, upon reviewing the entirety of this disclosure, will be aware of various forms that support structures may take consistently with the described methods and systems.

With continued reference to FIG. 1, processor 108 is further configured to correlate one or more variations of the part data 128 with an improvement to a manufacturability datum 136. An "improvement to a manufacturability datum" means an indication that the manufacturability of the part is improved or that the part would be easier to manufacture. For example, an improvement to a manufacturability datum may include a reduction in cost, manufacturing time, required material, labor, lead time, set up time, fewer tool changes, higher throughput, more easily machinable materials, and the like. "Variation" as used herein in reference to part data are defined as changes to one or more elements of the part data 128. For example, a variation may include a change to or comparison between dimension, tolerance, material, manufacturing parameter used to create part 124, machining parameter used to create part 124, tooling used to machine part 124, feed rate, spindle speed, cut width or depth, part feature, feature size, cost (e.g., a maximum permissible cost per unit), number of units produced, labor hours, geometry, area, surface area, volume, density, part function or functionality, parameters of components for an assembly that includes the part 124 (e.g., number, geometry, dimensions, and any of the above elements of part data that apply to an assembly of parts), and the like. A variation may additionally or alternatively be indicated by comparing two or more parts or parameters of parts. For instance, instead of specifying a change to an existing parameter, a variation may specify two different states of the same or similar part. As a non-limiting example, a variation in part material may compare two parts otherwise identical except for selected material. Any variation listed herein may be embodied as such, and any reference in this disclosure of "one or more variations of part data" may include one or more comparisons of two or more parts. "Manufacturability datum" is defined as a value, parameter, description, or indicator that provides information about requirements for manufacturing a part. Manufacturability datum 136 may indicate a relative ease with which a part may be manufactured. Manufacturability datum 136 may indicate if the part to be manufactured is possible to manufacture. In an embodiment, manufacturability datum 136 may be an evaluation of whether a part can be consistently manufactured to a given standard. A variation to part data 128 may be determined in accordance with a "design for manufacturability" or "design for manufacturing" (DFM) approach. The terms "design for manufacturability" or "design for manufacturing" are used interchangeably herein. "Design for manufacturability" is the process of designing or engineering a part specifically to effect more desirable manufacturing characteristics such as lower cost, decreased manufacturing time, fewer tool changes, less fixture and setup time, lower fixture and setup cost, higher throughput, reduced material requirements (e.g., less mass per part, easier to machine materials, etc.), and the like.

With continued reference to FIG. 1, manufacturability datum 136 may comprise a Boolean value, a score, or a single datum value for the part to be manufactured. Additionally, manufacturability datum 136 may comprise a list of geometric features depicted in a model, where each geometric feature in the list receives an individual manufacturability datum 136. Manufacturability datum 136 may comprise a vector or table of values linked to and/or corresponding to features of the part 124. In an exemplary embodiment, manufacturability datum 136 may be created based on a consideration of one or more of the amount of force it would take to machine the parts without causing deflection of the part in the fixturing system, available feed rates, available milling spindle speeds, achievable material removal rates, potential occurrences of work hardening associated with various machining methods, machinability of the part, chemical, electrical, or other material interactions, part dimensions such as final dimensions or feedstock dimensions, or other considerations. In an embodiment, manufacturability datum 136 may be a time (e.g. a milling time, a machining time, a lathing time, a total manufacturing time, a lead time, a setup time, a delivery time, a time for an entity to receive a completed part, and the like), a cost (e.g. an overall cost, a material cost, a labor cost, a supply cost, a machine usage cost, and the like), a cost per unit time (e.g. a machinist hourly rate, a machine usage hourly rate, a cost per minute, cost per second, and the like), a weight or density (e.g. an finished part weight, a part constituent material density, etc.), a maximum dimension, a minimum dimension. Both deflection of tool and part may deteriorate accuracy of the part and result in a failure to meet specified dimensions or tolerances. "Machinability" as used herein is defined as the ease with which material can be removed from a part in order to create that part. A person skilled in the art would understand that in general, parts with smaller tolerances will be less machinable than parts with larger tolerances.

With continued reference to FIG. 1, manufacturability datum 136 may be based on, correspond to, comprise, or be represented as a metric, value, number, relative descriptor, parameter, scale, weight, range of values, ranking, semantic description, relative percentage compared to the manufacturing of a similar part or parts, percentile of one or more parameters related to the manufacturing of the part 124 or other parts, or any other suitable metric indicating requirements for manufacturing a part. Manufacturability datum 136 may be a function of machining time, required labor, material type, part geometry, available machining methods, available tools, cost constraints, order of feature creation, and the like. For instance, manufacturability datum 136 may comprise a list of percentiles of parameters for a given part 124 and related part data 128 as compared to other parts. In some embodiments, information about other parts may be stored in storage 120. In some embodiments, information about other parts may be utilized comparatively to generate manufacturability datum 136. In an embodiment, manufacturability datum 136 may comprise percentiles of various parameters as compared to a database of corresponding data, such as material cost, manufacturing time, lead time, labor time, labor cost, machinability, geometric complexity, number of machining steps, and the like. In an embodiment, manufacturability datum 136 may indicate that manufacturing of a given part is not possible and the part may be optimized according to a further determination of variations to part data 128.

With continued reference to FIG. 1, in an exemplary embodiment, the processor 108 may determine that, given part data 128, the particular parameters of labor time, labor cost, material cost, machine time, geometric complexity, process cost, and the like, each fall into a respective percentile as compared to similar parts or all parts of which there is data. Processor 108 may select parts from storage 120 with which to compare part 124 based on a number of criteria. For example, processor 108 may select parts made of the same or similar materials, parts occupying a similar total volume (e.g. ±20% of the part 124), parts with the same or similar largest and smallest dimensions (e.g. ±20% of the part 124), parts requiring similar volumes of material subtraction, parts with an overall cost similar to an estimated cost of the part 124 (e.g. ±20% of the part 124), parts made to perform the same or similar function as part 124, parts made for the same entity or user as part 124, parts created using a particular machining method or group of machining methods, parts with the same general shape, parts with at least one same or similar tolerance datum, parts with at least one same or similar feature (such as fillets, protrusions, holes, internal or external geometry, etc.) or any suitable selection criteria. The foregoing data may be part of a training data set correlating any one or more of the above parameters with any other one or more of the above parameters. Processor 108 may further select a desired range of percentiles to compare prior to selecting parts. For example, processor 108 may determine that the most relevant data should come from parts between the $20^{th}$ and $80^{th}$ percentiles of a given category. Processor 108 may then retrieve part information corresponding to any one or more of the above parameters (or any other parameter listed in this disclosure that one of ordinary skill in the art would be relevant for comparison purposes) within the determined percentile range. Processor 108, machine learning module 116, or another device may utilize a machine learning classifier in accordance with the disclosure to classify manufacturability datum by tolerance, machine type, cost, tool, material, labor hours, percentiles based on a comparison of parameters for similar parts, total manufacturing time, geometry, size, volume, area, and the like. For example, a classifier may be configured to output at least a datum that labels or otherwise identifies a set of data that are clustered together, found to be close under a distance metric such as a norm, or the like. Machine-learning module 116 may generate a classifier using a classification algorithm, defined as a process whereby a computing device and/or any module and/or component operating thereon derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, processor 108, machine learning module 116, or another device may classify elements of manufacturability datum training data into different manufacturing types, manufacturing tools, possible tolerances, relative percentiles, material, or similar parameters listed above. Processor 108, machine learning module 116, or another device may further classify sub-parameters such as manufacturability datum for tolerances less than 0.01 mm, less than 0.001 mm, less than 0.5 mm, manufacturability datum for similar materials such as types of steel, types of plastic, types of aluminum, and so on. Processor 108, machine learning module 116, or another device may classify elements of training data based on a human-specified criteria, a computer-generated criteria, an algorithmically determined criteria, or any suitable selection criteria. Processor 108 may retrieve data corresponding to manufacturability datum and existing improvements to manufacturability datum from storage 120, memory 112, machine learning module 116, or any suitable storage source. The comparative part data may then be selected based on the output of the classifier. Processor 108 may retrieve, store, and update data associating comparative part information with percentiles or other metrics using storage 120, as part of part data 128, through user interface 140, or another source as apparent from this disclosure. Processor 108 may utilize or receive information from machine learning module 116, including using machine learning algorithms described in accordance with this disclosure, to determine any of the above parameters or percentiles. For instance, training data correlating any one or more of the above parameters with any other one or more of the above parameters may be used to train a machine learning model in accordance with this disclosure. Any of the above parameters may then be input to the trained machine learning model and a corresponding percentile of the part 124 for one or more selected categories may be generated.

With continued reference to FIG. 1, in an exemplary embodiment, the manufacturability datum 136 may indicate that the part 124 is in the $20^{th}$ percentile of lead time (meaning 20% of compared parts have lower lead time and 80% of compared parts have higher lead time) but the $80^{th}$ percentile of manufacturing time and cost (meaning 80% of compared parts have lower manufacturing time and cost, and 20% of compared parts have a higher manufacturing time and cost). The processor may compare this with a predetermined threshold, such as a threshold specified by entity 132, retrieved from storage 120, or which processor 108 is otherwise configured to compare to; this may result in a determination that the manufacturability of the part is unacceptably low. Manufacturability datum 136 may itself be represented as a percentile when compared to manufacturability datum of other parts. For instance, manufacturability datum 136 may be calculated by taking an unweighted average of percentiles for chosen parameters and inverting some percentiles according to a higher manufacturability being more positive where necessary. Inverting the percentiles might be necessary to ensure the proper conclusion is reached: for instance, evaluating manufacturability of a part based solely on the part being in the 20$^{th}$ percentile of cost may imply relatively good manufacturability since the part is cheaper than 80% of comparable parts. However, describing the part as being in the 20$^{th}$ percentile of manufacturability may imply that 80% of comparable parts are more manufacturable, which is the opposite conclusion implied by cost alone.

With continued reference to FIG. 1, a correlation between one or more variations of the part data 128 and an improvement to a manufacturability datum 136 may indicate that if part data 128 is altered or adjusted in a particular way, manufacturability datum 136 will accordingly change in a predictable or defined manner. For example, part data 128 may indicate that entity 132 has specified stainless steel as the material for part 124. However, a part 124 made from aluminum may function equally well and would be much easier and faster to machine than steel. A correlation may therefore be established indicating that varying the material specified by part data 128 from steel to aluminum would accordingly improve manufacturability datum 136 significantly. A correlation between one or more variations of the part data 128 and an improvement to a manufacturability datum 136 may correlate a change in manufacturability datum 136 with any one or more variations such as those listed above, including a change to a dimension, tolerance, material, manufacturing parameter used to create part 124, machining parameter used to create part 124, tooling used to machine part 124, feed rate, spindle speed, cut width or depth, part feature, feature size, cost (e.g., a maximum permissible cost per unit), number of units produced, labor hours, geometry, area, volume, density, part function or functionality, parameters of components for an assembly that includes the part 124 (e.g., number, geometry, dimensions, and any of the above elements of part data that apply to an assembly of parts), or any other parameters related to a part or manufacturing process either listed explicitly herein or as would be obvious to one of ordinary skill in the art.

With continued reference to FIG. 1, a correlation between one or more variations of the part data 128 and an improvement to a manufacturability datum 136 may be in the form of training data to train a machine learning model. For example, a training data set may be prepared by one or more humans as part of a supervised machine learning process. An exemplary training data set may consist of labels or weights between variations of part data 128 ("variations" may include a comparison of two or more distinct instances of a similar part) and manufacturability datum. In some embodiments, a machine learning classifier may be used to classify variations, manufacturability datum, or correlations between the two. For example, a classifier may be configured to output at least a datum that labels or otherwise identifies a set of data that are clustered together, found to be close under a distance metric as described below, or the like. Processor 108, machine-learning module 116, or other computing device may generate a classifier using a classification algorithm, defined as a process whereby a computing device and/or any module and/or component operating thereon derives a classifier from training data. For example and without limitation, classification may be performed using linear classifiers such as logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, processor 108, machine-learning module 116, or other computing device may classify elements of variation training data into different machining methods, such as milling, turning, electrical discharge machining, water jet, drilling, and so on. Processor 108, machine-learning module 116, or other computing device may further classify machining methods based on smallest possible tolerances, such as machining methods capable of reaching ±0.01 mm, machining methods capable of reaching ±0.001 mm, machining methods capable of reaching ±0.0001 mm, etc. Processor 108 and/or machine learning module 116 may classify elements of training data based on manufacturability datum corresponding to parts made of the same or similar materials, parts occupying a similar total volume, parts with the same or similar largest and smallest dimensions, parts with an overall cost similar to an estimated cost of the part 124, parts made to perform the same or similar function as part 124, parts made for the same entity or user as part 124, parts created using a particular machining method or group of machining methods, or any suitable selection criteria. Processor 108 may retrieve data corresponding to part data 128 or parameters related to part data 128 and existing improvements to second design parameters from storage 120, memory 112, machine learning module 116, or any suitable source.

With continued reference to FIG. 1, the processor 108 is further configured to select at least one of the one or more variations of the part data based on the manufacturability datum 136 to create optimized part data 144. "Optimized" as used herein is defined as improved, designed for a particular purpose, maximizing a desired characteristic, or tending to improve a desired characteristic at the same time lowering the fabrication cost. For example, if a part would have equally satisfactory performance when made from any one of three different materials, then optimizing the material choice for cost could mean selecting the cheapest material to manufacture the part from. "Optimized part data," as used herein, is defined as part data which has been optimized as compared to part data 128. The optimized part data 144 may be created by selecting one or more variations that are the most strongly correlated with increases in manufacturability datum 136. The optimized part data 144 may be created by selecting the variation that leads to the largest increase in manufacturability datum 136. The optimized part data 144 may be created by selecting one or more variations based on a specified parameter or limitation. For example, if it is specified that only the part tolerances may be altered and that all other part data including material, dimensions, and manufacturing tools are to be fixed, then the optimized part data 144 may be created by selecting one or more tolerances correlated with the largest increase in manufacturability datum 136. Since manufacturability datum 136 may be embodied directly as a manufacturing parameter such as machining time, selecting one or more variations of the part data based on the manufacturability datum 136 to create optimized part data 144 may include selecting a variation that is directly proportional to manufacturability datum 136. For example, manufacturability may comprise machining time for a given part. Optimized part data 144 may be created by specifying a higher feed speed, which will directly lower machining time (and thereby improve manufacturability datum 136) in proportion to the increase in feed speed. Optimized part data 144 may be created by alternative design yet equivalent or even superior mechanical functionality part data. Entry level mechanical designer are often design inefficient part which translate to expensive to fabricate and more materials yet inferior to accomplish the specification or the design intent. By refereeing to the superior designs for the similar functionary, optimum part data is attained.

With continued reference to FIG. 1, optimized part data 144 may take any suitable form, including, but not limited to, one or more parameters defining part 124 (such as dimensions and tolerances of part 124), an updated part model of the part 124 such as an updated description, illustration, two-dimensional model, three-dimensional model, computer-aided design (CAD) model (including, but not limited to, 3D computer model, wireframe model, solid model, surface model, mesh), CAD drawing, computer-aided machining (CAM) model, engineering drawing, sketch, group of dimensions, surface mesh, coordinates, or anything that shows or otherwise defines the selected one or more variations. Optimized part data 144 may be specified by a single element of data or single parameter from part data 128 such as part material, largest dimension, a uniform tolerance value for all dimensions, or any element of data or parameter either explicitly recited herein or as would be known to one of ordinary skill in the art as being pertinent to part data 128.

With continued reference to FIG. 1, the processor 108 may select at least one of the one or more variations of the part data based on the manufacturability datum 136 to create optimized part data 144 using machine learning. In an embodiment, optimized part data 144 may be generated automatically using a machine learning model. For example, processor 108, machine learning module 116, or a suitable device may train a machine learning model in accordance with this disclosure on training data correlating one or more of the above variations to part data with one or more improvements to manufacturability datum 136. Processor 108, machine learning module 116, or a suitable device may instantiate a machine learning model or algorithm trained by another device. Training data may be produced in a supervised manner, e.g. a person or persons examine the correlations indicated by training data and confirm the data represents accurate and factual correlations or explicitly provide the correlations themselves (a process referred to as "labeling"). Training data may be produced in an unsupervised manner, e.g. correlations between parameters may be established within the training data based on a known method and used in a machine learning model or algorithm without human supervision. A trained machine learning algorithm may receive as inputs any of the above elements of part data 128 and/or manufacturability datum 136 and output optimized part data 144. Processor 108 and/or machine learning module 116 may store, retrieve, exchange, and update information corresponding to training data, inputs, and/or outputs listed above on storage 120 or any other suitable data storage location. In an embodiment, a suitable machine learning model or algorithm trained, executed, and/or instantiated on devices described above may include a supervised or unsupervised machine learning process; a regression model; a linear discriminant analysis; a quadratic discriminant model; a gradient descent model such as stochastic gradient descent; naïve Bayes model; decision tree model; neural network including convolutional neural network model; or models listed with reference to FIG. 4.

With continued reference to FIG. 1, the processor 108 is further configured to generate an optimized part model 152 based on the optimized part data 144. An "optimized part model" as used herein is defined as a part model that incorporates or illustrates optimized part data 144. The processor 108 is further configured to generate an optimized toolpath 148 based on the optimized part data 144, wherein the optimized toolpath corresponds to a first tool 176 (which may be specified by part data 128 or by another source) used to manufacture the part. A "toolpath," as used herein, is defined as a path through a space created by the relative motion of a part and a tool during the manufacturing of the part. An "optimized toolpath" is a toolpath incorporating, reflecting, or created based on optimized part data. A "tool," as used herein, is an object, system, or machine used to remove material from a stock or additively deposit material to create a part. A tool may be any suitable object, system, or machine including a mill, a lathe, an EDM machine, a laser cutter, a saw, a water jet, a grinder, or any similar object, machine, or system used to perform manufacturing processes recited herein or commonly known in the art. The toolpath indicates where material will be added in an additive manufacturing process or removed in a subtractive manufacturing process. In some cases, particularly in a subtractive manufacturing process, the toolpath defines the volume of material that will be removed once the toolpath has been completely traversed for a given tool in a given arrangement. In some manufacturing processes such as end milling, the tool itself is moved and the part is held stationary. In some manufacturing processes such as lathing, both the tool and part are moved relative to one another to effect material removal. In some processes, the tool is held still and the part is moved to effect material removal. The same toolpath, when used with different tools (for instance, end mills of different diameters), may remove different amounts of material. For example, a toolpath for facing a part using a ¼" diameter endmill may leave a completely flat surface, whereas the same toolpath with a ⅛" diameter endmill may leave material leftover that would form channels in one face of the part. In some embodiments, the toolpath is specific to a particular tool, e.g. specific to an endmill of a particular diameter, specific to a wire EDM, specific to a lathe, etc.

With continued reference to FIG. 1, an optimized part model 152 generated based on the optimized part data 144 may comprise a model as defined in this disclosure, including a description, illustration, two-dimensional model, three-dimensional model, computer-aided design (CAD) model, CAD drawing, computer-aided machining (CAM) model, engineering drawing, sketch, group of dimensions, surface mesh, coordinates, or anything that shows or otherwise defines a part. In an embodiment, the optimized part model 152 may be created by altering an existing model to reflect the selected one or more variations of the part data 128. In an embodiment, an optimized part model 152 may be a new part model be created by processor 108 reflecting the one or more variations to part data 128. Processor 108 may replace unoptimized part data with optimized part data 144 and create a model reflecting the optimized part data 144. In an exemplary embodiment, part data 128 may contain tolerance data specifying tolerances of ±0.001 mm for all dimensions. Processor 108 may determine that selecting ±0.01 mm may be a more optimal tolerance value for all dimensions and create optimized part data 144 reflecting the updated tolerance value. Processor 108 may further create an optimized part model 152 using optimized part data 144 such that optimized part model 152 contains the updated tolerance value. In an embodiment, processor 108 may generate optimized part model 152 using the same software used to generate a previously-created part model. In an embodiment, processor 108 may directly edit or edit a copy of a file containing a model of part 124. In an embodiment, processor 108 may directly edit or edit a copy of the file containing a model of part 124. In an embodiment, processor 108 may create optimized part model 152 by directly editing part data 128 or may create optimized part model 152 by editing a copy of part data 128.

With continued reference to FIG. 1, optimized part model 152 may be generated by one or more machine learning algorithms. Processor 108 may identify one or more variations of part data 128 that may improve manufacturability datum 136 using machine learning as outlined above, which may then be applied to optimized part model 152. For instance, processor 108 and/or machine learning module 116 may access a training data set correlating parameters such as tolerance data, part cost, manufacturing time, labor, throughput, lead time, part geometry, feature, feature size, material or materials, set-up time, required tools or types of machines, and/or any relevant metric relating to manufacturability. Inputs to the to the machine learning model may include semantic datum, manufacturability datum 136, workpiece material considerations, the time and cost to manufacture a part, tools, materials, dimensions, tolerances, volumes, areas, features, functionality, the optimized toolpath, one or more other toolpaths, part data 128, optimized part data 144, parameters specified by a user or entity, and the like. The output from the machine learning model may be a corresponding optimized part model 152. The training data set is a plurality of data entries containing a plurality of inputs that are correlated to a plurality of outputs for training a processor by a machine-learning process to make corrections to improve manufacturability for a part as described with reference to FIGS. 4-6 below. Training data may contain information about any of the above parameters as well as workpiece materials including material type, microstructure, grain size, heat treatment, chemical composition, fabrication, hardness, yield strength, and/or tensile strength. Training data may include tolerances, geometric features for the part to be manufactured, time, cost, a set of tools that is required to machine the part, set-up and load time for the part to be manufactured, and/or manufacturability. Processor 108, machine learning module 116, or another device may use these training data to train a machine learning algorithm in accordance with the disclosure to generate a computer model as an output, where an outputted computer model is subject to one or more constraints such that the optimized part model 152 is a part model with the appropriate optimized part data 144. In other embodiments, training data may include correlations between corrections or alterations to tolerancing and dimensioning data and the subsequently produced optimized part model 152. Training data may include any past corrections of the part stored in storage 120 or a user input. Training data may be subject to human supervision, where one or more persons confirm that the correlations indicated by the training data are accurate. Outputs described above may then be applied to an optimized part model 152. Processor 108 and/or machine learning module 116 may store, retrieve, exchange, and update information corresponding to training data, inputs, and/or outputs listed above on storage 120 or any other suitable data storage location. In an embodiment, a suitable machine learning model or algorithm trained, performed, and/or instantiated with machine learning processes described above may include a supervised or unsupervised machine learning process; a regression model; a linear discriminant analysis; a quadratic discriminant model; a gradient descent model such as stochastic gradient descent; naïve Bayes model; decision tree model; neural network including convolutional neural network model; or models listed with reference to FIG. 4.

With continued reference to FIG. 1, processor 108 may generate an optimized toolpath 148 based on the optimized part data 144. Processor 108 may utilize CAM software to generate the optimized toolpath 148, such as MASTER-CAM® or AUTODESK FUSION 360® CAM software. Optimized toolpath 148 may specify a path for a tool given a specified location of a part, a path for a part given a specified location of a tool, or relative locations of a tool and a part while both are moving, such that the addition or removal of material is effected to partially or fully create part 124. Optimized toolpath 148 may be a continuous toolpath such that the part 124 is created from start to finish or may specify material removal or addition to create a single feature of a part or a portion of a feature of the part. Optimized toolpath 148 may be generated according to any one or more of a tool size, a tool type, a feature size, a feature type, a DFM methodology, a manufacturing machine capability or limitation (e.g., taking into account axes of movement of a CNC machine, accounting for the necessity of immersing a workpiece in a fluid medium for a wire EDM process), a material, a removal rate such as material removal rate or area removal rate, a likelihood or occurrence of work hardening, a geometry, a fixture type, a fixture location, a fixture area, spindle speed, feed speed, coolant availability, coolant flow rate, a cost (e.g. labor cost, machine usage cost, material cost), material removal efficiency, a minimization or other constraint on path length, a minimization or other constraint on number of movements, a minimization of tool changes, minimization or other constraint on manufacturing and/or machining time, and the like. In an embodiment, processor 108 generates an optimized toolpath 148 for a subtractive manufacturing process by determining a size of a tool such as an endmill or EDM wire. For a given position of the tool relative to the workpiece, the tool will remove an area equal to an overlap of the tool with the workpiece. The final part is produced by selectively removing material from the workpiece until only the final part remains. The maximum area removed by a tool is the tool width of cut×tool depth of cut. For instance, a ¼" diameter endmill would be able to remove a maximum area ¼" times the depth of cut. The volume removed is then the removal area times distance traveled into the workpiece. Distance traveled into the workpiece per unit time may be expressed as a feed rate. A "removal rate" as used herein is an amount of material (measured in terms of geometry removed or mass/weight removed) removed per unit time from a workpiece to create a part. "Material removal rate" (MRR) is a volume of material removed per unit time for a tool given feed rate and may be expressed as:

$$MRR = \langle \text{Removal Area} \rangle \times \langle \text{Feed Rate} \rangle$$

where Removal Area equals:

$$RA = \langle \text{Width of Cut} \rangle \times \langle \text{Depth of Cut} \rangle$$

An area removal rate may be expressed as any of the following:

$$ARR = \langle \text{Depth of Cut} \rangle \cdot \langle \text{Feed Rate} \rangle$$

$$ARR = \langle \text{Width of Cut} \rangle \cdot \langle \text{Feed Rate} \rangle$$

$$ARR = \langle \text{Stepover} \rangle \cdot \langle \text{Feed Rate} \rangle$$

The optimized toolpath 148 may be determined by specifying a series of points through which a tool leading edge or other reference point may pass through, where the tool (or part relative to the tool, or both are moved) is moved linearly from one point to the next at a specified speed. The optimized toolpath 148 may be determined by choosing starting positions for either the tool, the workpiece, or both, wherein the tool and workpiece are positioned relative to one another, for example using a coordinate system in accordance with this disclosure. In an embodiment, the optimized toolpath 148 may then be determined such that the maximum amount of material is removed while leaving the machined surface in an acceptable state. The optimized toolpath 148 may additionally be generated such that the desired volume of material is removed as efficiently as possible and/or with as little workpiece or tool movement as possible.

With continued reference to FIG. 1, the optimized toolpath 148 may be generated using machine learning. For example, processor 108, machine learning module 116, or another computing device may train a machine learning algorithm with training data correlating two or more of tool types, tool sizes, feed speeds, surface finish requirements, cost, cost rates, time, labor, tolerances, part or workpiece dimensions, part or workpiece areas, part or workpiece volumes, part or workpiece materials, tool capabilities or limitations, maximum or minimum reachable areas, maximum or minimum dimensions, maximum or minimum depths of cut, maximum or minimum area removal rates, maximum or minimum material removal rates, possible tool or workpiece positions, machining workarounds (for instance, removing a chunk of material by sawing or wire EDM-ing through the location where the chunk attaches to the rest of the workpiece instead of machining away the chunk little by little), or any other relevant machining parameter disclosed herein or obvious to one of ordinary skill in the art. The correlations indicated by such training data may be determined by one or more skilled humans who label the training data accordingly in a supervised machine learning process. In an alternative embodiment, processor 108, machine learning module 116, or another device may utilize a machine learning classifier in accordance with the disclosure to classify parameters corresponding to toolpaths. For example, a classifier may be configured to output at least a datum that labels or otherwise identifies a set of data that are clustered together, found to be close under a distance metric such as a norm, or the like. Machine-learning module 116 may generate a classifier using a classification algorithm, defined as a process whereby a computing device and/or any module and/or component operating thereon derives a classifier from training data. Classification may be performed using, without limitation, linear classifiers such as without limitation logistic regression and/or I Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, processor 108, machine learning module 116, or another device may classify elements of training data by different tool types, minimum possible tolerances, machining or manufacturing costs (such as setup costs, costs per unit time, machine rental costs, cost of power required to run a machine, etc.), manufacturable features or parts, workpiece maximum dimension (such as maximum linear dimension, maximum area, maximum volume, etc.), minimum relative motion between tool and workpiece, available axes of motion, etc. Processor 108, machine learning module 116, or another device may further classify parameters related to toolpaths such as work volume size (i.e. coordinates defining maximum extents of where a tool could interact with a workpiece), feature capability (e.g. fillets, inner or outer arcs, undercuts, channels, curves, maximum depth, etc.), tool geometry, tool interferences, available axes of motion for a tool, available axes of motion for a workpiece, tool size, material compatibility, material addition or removal directions, restrictions (e.g. material, chemical, electrical, power, manufacturing speed, etc.), and the like. Processor 108 and/or machine learning module 116 may classify elements of training data based on tool area, tool maximum dimension, tool minimum dimension, tool area removal rate (maximum, minimum, or other), tool material removal rate (maximum, minimum, or other), tool material addition rate (maximum, minimum, or other), or any suitable selection criteria. Processor 108 may retrieve data corresponding to toolpath parameters and existing improvements to toolpath parameters from storage 120, memory 112, machine learning module 116, or any suitable storage source.

With continued reference to FIG. 1, once toolpath training data has been classified, a toolpath may be generated using a machine learning algorithm by supplying inputs to the machine learning algorithm that have been correlated with outputs as part of training data such as toolpath training data described above. The inputs may be any of those listed above with reference to toolpath training data including feed speeds, tool dimensions, part dimensions, tolerances, material types, machine types, or any suitable inputs, and the machine learning algorithm may output a completed optimized toolpath 148 as a result. For instance, and without limitation, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements corresponding to toolpath training data set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired toolpath values at the output nodes. This process is sometimes referred to as deep learning.

With continued reference to FIG. 1, processor 108 may be configured to generate the optimized toolpath 148 based on a removal rate. A removal rate may be expressed as a material removal rate or area removal rate as outlined above. For example, a machining facility may be given an order to create a part by facing (i.e., removing material from the entirety of a surface to leave a flat surface) a cubic block of aluminum. The machining facility may only have two sizes of end mill bits capable of machining the given part, a 1-inch diameter bit and a ½ inch diameter bit. The facility may be required to produce the part in less than a threshold amount of time (such as 20 minutes), which may require a certain amount of material be removed from a workpiece in the 20-minute limit. For example, fabricating the part may require 20 cubic inches of aluminum be removed, which means the tool should average a 1 cubic inch per minute material removal rate. Processor 108 may calculate a minimum necessary material removal rate such that the part could be successfully manufactured within the threshold amount of time. In such an example as above, for a machine with a maximum feed speed of 10 inches per minute, this means that the average removal area would need to be 0.1 square inches when the machine was running at its maximum feed speed, or a combination wherein <Feed Speed>× <Removal Area>=1 cubic inch/minute. Therefore, the processor 108 may select the 1-inch diameter mill bit and generate a path ½ inch deep with a feed speed of 2 inches per minute, which gives a 1 cubic inch per minute material removal rate. The toolpath could then be selected to form a boustrophedonic pattern where the tool removes material in one direction, moves perpendicular to the first direction a set distance, and then continues removing material in the direction opposite the first. In an alternative embodiment, the processor 108 may generate the optimized toolpath by selecting the ½-inch diameter mill bit, keeping the cut depth ½ inch (resulting in a ¼ square inch cutting area), but increasing the feed speed to 4 inches per minute or higher, thus successfully removing 1 cubic inch per minute of material. Changing the mill bit as such may require a change in toolpath. For example, if a toolpath is generated for a 1-inch diameter mill bit such that the tool removes the maximum amount of material (i.e. the bit does not overlap the removed areas at all, or as little as physically possible) and the tool is switched to the ½-inch mill bit, only half the material will be removed. Conversely, if a toolpath is generated for a ½-inch mill bit and the mill bit is switched to a 1-inch mill bit, the original toolpath will not provide optimal material removal since part of the mill bit will part of the area that has already been removed. These calculations may include a calculating of area removal rate:

ARR=<Width of Cut>·<Feed Rate>

ARR=<Depth of Cut>·<Feed Rate>

ARR=<Stepover>·<Feed Rate>

Machine learning algorithms used to generate optimized toolpath 148 may utilize any of the above material or area removal rates as inputs to a machine learning model that correlates those removal rates with toolpath output parameters such as pass spacing, tool size, tool type, full toolpath, etc.

With continued reference to FIG. 1, in an embodiment, optimized part data 144 may be created by first generating a first toolpath. For example, the first toolpath may indicate that the manufacturing time would take longer than allowed by the entity 132. The first toolpath may indicate that a first tool would not be able to machine part 124 due to a conflict between a non-cutting part of the machine and the workpiece, and without modification or improvement, the part 124 could not be made. Processor 108 may then determine and select the one or more variations of the part data 128 as outlined above and regenerate an optimized toolpath in accordance with the above description. The variations to part data could then be incorporated into part data 128 to create optimized part data 144. A first toolpath may be generated in accordance with processes described above, including using a machine learning algorithm trained on toolpath training data. In an exemplary embodiment, part data 128 may contain a model for a part to be designed with five repetitive features spaced 1.15 inches apart. A toolpath generated by processor 108 may indicate that a 1-inch diameter endmill bit would be the most efficient tool for creating the features but would require two passes between each feature because the 1-inch diameter of the mill bit would leave 0.15 inches of material leftover which would have to be removed for a second pass. The processor 108 may determine that the features are able to be moved within the part model such that each feature is 1 inch apart from adjacent identical features, in which case the material between features could be removed in a single pass using a 1-inch diameter endmill. This would reduce the time to manufacture the finished part. The optimized part model 152 may be generated by the processor 108 to reflect this closer feature spacing and optimized part data 144 created by incorporating optimized part model 152. Optimized toolpath 148 to generate the part 124 may be generated by processor 108, with the optimized toolpath reflecting the new, optimized geometry.

With continued reference to FIG. 1, processor 108 is further configured to generate a quote for manufacturing of the part based on the optimized toolpath, wherein the quote includes a time of receipt of the manufactured part. Quote 156 may include one or more of tolerance data, optimized part model 152, optimized toolpath 148, and the manufacturability datum 136. Processor 108 may define one or more pricing parameters. "Quote," as used herein, is defined as information related to the completion of manufacturing of a part. For example, a quote may comprise an invoice, bill, exact or estimated cost, bill of materials, part data 128, optimized part data 144, a model of the part 124 in accordance with the disclosure including optimized part model 152, an indication of variations between part data 128 and optimized part data 144, manufacturability datum 136, a time related to provision of the part (including time of receipt, manufacturing time, shipping time, delivery time, and the like), or any relevant data disclosed herein. A time of receipt may include a specific day or time of delivery of a manufactured part to an entity, a specific day or time of delivery of a manufactured part to a shipping company, a specific day or time manufacturing of a part will be completed, a fastest day or time that complete manufacturing of a part may be performed, a specific day or time that an object will be received by a person or entity 132, a length of time (in seconds, minutes, hours, days, or any suitable unit of time) from a reference point until a finished part is delivered to an entity 132, a length of time (in seconds, minutes, hours, days, or any suitable unit of time) from a reference point until a finished part is delivered to a shipping company, a length of time (in seconds, minutes, hours, days, or any suitable unit of time) from a reference point until manufacturing is completed, a length of time (in seconds, minutes, hours, days, or any suitable unit of time) from a reference point until part manufacturing is finished, a length of time (in seconds, minutes, hours, days, or any suitable unit of time) from a reference point until an object will be received by a person or entity 132, and the like. A "shipping time" is defined as a time related to the shipping of a completed part. Examples of a shipping time include a day on which a completed part is expected to ship, a time of day at which a part is expected or contracted to ship, a duration of transit from when a part is picked up from a manufacturer to when it is delivered to a customer such as entity 132, a time of delivery of the manufactured part, a day of delivery of the manufactured part, a length of time related to preparation, pickup, delivery, dropoff, or other aspect of shipping, and the like. "Ship" or "shipping" is defined as the act or service of transporting an object from one entity to another. For example, shipping may involve transporting a completed part from a manufacturer to a customer.

With continued reference to FIG. 1, processor 108 may further be configured to determine a time of receipt based on a calculation of market milling minutes. "Market milling minutes" is defined as the time needed to create a typical part. Market milling minutes may be calculated as.

$$T^{MKT} = \frac{V_1}{MRR_1} + \frac{V_2}{MRR_2} + \frac{V_3}{MRR_3} + \ldots + \frac{V_n}{MRR_n} + \frac{S_1}{ARR_1} + \frac{S_2}{ARR_2} + \frac{S_3}{ARR_3} + \ldots \frac{S_n}{ARR_n}$$

Where $V_{1\ldots n}$ are volumes removed in a given section or milling step and $S_{1\ldots n}$ are surface areas of a cutting implement for a given section. Time of receipt may include market milling minutes in addition to another time such as shipping time or may include only market milling minutes.

With continued reference to FIG. 1, processor 108 may define one or more pricing parameters. "Pricing parameters" are parameters that influence a price or cost to manufacture a part. Examples of "pricing parameters" include, but are not limited to, material costs, fabrication costs, assembly costs, tooling/setup costs, finishing costs, connection costs, handling costs, shipping costs, expediting costs, packaging costs, markups, volume discounts, etc. Quote 156 may be determined as a function of pricing parameters including tooling requirements, machine type, material, part geometry, part size, tolerance data, manufacturing time, labor, throughput, lead time, feature, feature size, material or materials, set-up time, required tools or types of machines, and/or any relevant metric relating to manufacturability, tool availability, material availability, supply chain parameters, shipping speed or costs, material removal rate, area removal rate, total toolpath length, number of toolpath segments, or other parameters that may affect how much a part costs to manufacture. Processor 108 may define a baseline cost using a set of default parameters, for example a generic part made out of 316 steel and would take 4 hours to manufacture may be priced at $500 and the price may be varied based on quantity produced, desired tolerance, desired manufacturing method, machine availability, geometry (such as size, shape, dimensions, areas, configurations, numbers of components and other features, such as openings, recesses, bosses, etc.), connection type(s) and features, finish type(s), and purchased or otherwise pre-fabricated parts (e.g., hardware) and subassemblies (e.g., hinges), etc. Pricing parameters can be, for example, per-unit costs/prices or one-time costs/prices, depending on the particular parameter. Quote 156 may be determined using machine learning, for instance as instantiated on processor 108 and/or machine learning module 116. For example, processor 108, machine learning module 116, or another device may train a machine learning model in accordance with this disclosure on training data correlating one or more of the above pricing parameters with one or more other pricing parameters or a total output cost. Processor 108 and/or machine learning module 116 may instantiate a machine learning model or algorithm trained by another device. For example, training data may correlate finish types, material, manufacturing method, and labor to overall manufacturing cost. Training data may be produced in a supervised manner, e.g. a person or persons examine the correlations indicated by training data and confirm the data represents accurate and factual correlations. Training data may be produced in an unsupervised manner, e.g. correlations between parameters may be established within the training data based on a known method and used in a machine learning model or algorithm without human supervision. A trained machine learning algorithm may receive as inputs any of the above pricing or other recited manufacturing parameters and output a quote 156, including, for example, price, time to manufacture, and/or time to ship the completed part(s). Processor 108 and/or machine learning module 116 may store, retrieve, exchange, and update information corresponding to training data, inputs, and/or outputs listed above on storage 120 or any other suitable data storage location. In an embodiment, a suitable machine learning model or algorithm trained, performed, and/or instantiated with machine learning processes described above may include a supervised or unsupervised machine learning process; a regression model; a linear discriminant analysis; a quadratic discriminant model; a gradient descent model such as stochastic gradient descent; naïve Bayes model; decision tree model; neural network including convolutional neural network model; or models listed with reference to FIG. 4.

With continued reference to FIG. 1, and in a non-limiting embodiment, part data 128 and or optimized part data 144 is submitted to a machine-learning model once trained, which generates a quote 156 based on the correlated relationship or relationships. For instance, and without limitation, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from quote training data set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired quote values at the output nodes. This process is sometimes referred to as deep learning.

With continued reference to FIG. 1, quote 156 may further comprise or be generated using a firm fabrication price quote. A "firm fabrication price quote" is a price at which a user can get one or more predefined parts and/or one or more instantiations of a part manufactured by a manufacturer. In other words, it is a price at which a fabricator commits to charging or otherwise honoring for a particular fabrication order. As described below in detail, a firm fabrication-price quote is determined as a function of actual fabrication resource requirements to which a fabricator is subjected.

With continued reference to FIG. 1, quote 156 may comprise a datum indicating a suitable currency value to manufacture part 124. For example, quote 156 may be a value in U.S. Dollars or other currency indicating how much it would cost to manufacture part 124. Quote 156 may be modified in accordance with the number of parts to be manufactured, for instance if more than one part is to be manufactured. Quote 156 may be a datum indicating any suitable compensation for the manufacturing of part 124. For example, aside from a currency value, quote 156 may indicate a part 124 could be manufactured in exchange for a service (such as the installation of equipment in the manufacturing facility producing the quote), a number of labor hours (offered, for instance, to employees of the manufacturing facility producing the quote), a payment over time, a percentage of equity in a property, company, or the like, tickets to a sporting or entertainment event, or any suitable compensation. In an embodiment, currency may be fiat currency or cryptocurrency. In an embodiment, quote 156 may be in a weight of precious metals, gems, stones, jewelry, or the like. In an embodiment, quote 156 may indicate any object suitable as compensation to the entity operating apparatus 100 in exchange for manufacturing a requested part. In an embodiment, processor 108 may generate a quote 156 for the part 124 as originally submitted via part data 128, as well as a quote 156 based on tolerance data. This may allow entity 132 to compare the impact of updating tolerance data on the price of manufacturing a part and help reinforce how to better make decisions regarding engineering and manufacturing tradeoffs.

With continued reference to FIG. 1, processor 108 may generate an alternate manufacturing quote using a second quoting process as a function of the manufacturability datum 136 of the part to be manufactured and the identification of an unmanufacturable feature or difficult to machine feature. An "alternate manufacturing quote," as used herein, is a second manufacturing quote that is generated describing parts and/or features that cannot be easily manufactured and may be included in quote 156. In some embodiments, alternate manufacturing quote may be generated after quote 156. In other embodiments, alternate manufacturing quote may be generated in tandem with quote 156. In embodiments, processor 108 may be configured to transmit alternate manufacturing quote to user interface 140. "User interface" as used herein is defined as an interface that allows for the transmission of information to and from a user. In a nonlimiting example, both quote 156 and alternate manufacturing quote may be transmitted at the same time to a user interface 140, where user can see information related to parts to be manufactured and parts/features that cannot be manufactured. In some embodiments, alternate manufacturing quote may include only costs for manufacturable features and/or hard-to-manufacture features (i.e. features that have a manufacturability datum 136 below a threshold). In other embodiments, alternate manufacturing quote may include only costs related to manufacturability datum 136. In an embodiment, alternate manufacturing quote may be generated as a function of a second quoting process. A "second quoting process," as used herein, is the process of generating a second manufacturing quote. In some embodiments, second quoting process may occur after the first manufacturing quoting process. In some embodiments, second quoting process may provide entity 132 information related to parts and/or features that cannot be easily manufactured and may indicate red flags for manufacturing. In some embodiments, alternate manufacturing quote may include costs related to parts deemed too expensive to manufacture. In some embodiments, alternate manufacturing quote may list the parts and/or features deemed unmanufacturable. In a nonlimiting example, user may be provided with alternate manufacturing quote as to provide information as to what parts cannot be manufacturable, where alternate manufacturing quote may allow user to make a new quoting request with a different set of part data 128.

With continued reference to FIG. 1, processor 108 may be configured to identify unmachinable qualities of the part and may include these unmachinable qualities in quote 156. As used in the current disclosure, "unmachinable qualities" is any quality of the part to be manufactured causes the part to be determined as unmachinable. In a non-limiting example, qualities that make a part unmachinable may include workpiece material deteriorations, tolerances, geometric features for the part to be manufactured, surface roughness, time, cost, a set of tools, fixturing system, tool accessibility, set-up and load time for the part 124, manufacturability datum 136, and the like. If the given quality for a part is outside a predetermined range for any of these considerations the part may be considered unmachinable. The unmachinable qualities of the part may be displayed within the quote 156 or on the user interface 140.

With continued reference to FIG. 1, quote 156 may include a written description of the part 124. Additionally in a non-limiting example, quote 156 may include a materials list, time to manufacture, cost to manufacture, equipment used, the dimensions of the finished part, weight of the part, part number, and the like. A quote 156 may also include the geometrical tolerances calculated as a function of semantic datum to go with each feature of the part. A quote 156 may include a recommendation of which work materials to use to manufacture the part. In some embodiments, a quote 156 may include suggested methods of assembly for the part. A manufacturing quote may also include suggestions on the most efficient order of assembly for the part. Additionally, a quote 156 may make suggestions for corrections to an unmachinable part in order to make it machinable or manufacturable. These suggestions may include increasing the tolerances for various features, changing the material of the part, and/or altering the part design as outlined above.

With continued reference to FIG. 1, processor 108 may be configured to identify corrections to the part to improve machinability. Corrections to the part may include suggestions to use a different material that is more machinable. In other embodiments, corrections may include suggesting a larger tolerance for a particular feature of the part 124. Slight changes to the geometry of the features of the part may also be suggested to improve manufacturability. In embodiments. Processor 108 may determine that what correction needs to be made by using any one or more of part data 128, optimized part data 144, manufacturability datum 136, optimized part model 152, and tolerance data. For example, if a tolerance indicated by tolerance data is too small for a given tool, processor 108 may suggest relaxing that tolerance. In another nonlimiting example, if a part is unmachinable due to a particular geometric feature, processor 108 may make a suggestion that entails removing or altering that geometric feature. Processor 108 may be configured to output a plurality of different suggestions to improve machinability of the part 124. Part corrections may be included within the quote 156 or displayed on the user interface 140.

With continued reference to FIG. 1, processor 108 is further configured to transmit the quote 156 to a user interface 140. Processor 108 may further transmit part data 128, optimized part data 144, optimized part model 152, one or more toolpaths including first toolpath and optimized toolpath 148. Processor 108 may transmit any one, all, or a combination of the foregoing as part of outputs 164. In an exemplary embodiment, processor 108 may transmit the quote 156 and optimized part model 152 to the user interface 140 so the user can see how much it would cost to manufacture the part as well as what was changed in the model. Processor 108 may additionally transmit an indication of updates 160 informing the user of what was changed and why the changes were made to any of part data 128, optimized part data 144, optimized part model 152, manufacturability datum 136 one or more toolpaths including first toolpath and optimized toolpath 148, and/or quote 156, as well as what effect any changes had on the quote 156. As used herein, "indication" is defined as anything that conveys information. An indication may comprise a datum, data, signal, notification, warning, alert, noise or sound, transmission of light, vibration or other haptic feedback, or any general transmission, exchange, creation, copying, or shifting of information. Indications of updates may comprise a message, visual information (e.g. an image or moving picture), audible information, a color or color coding of presented information, a number, a list, a printout, a file, a table, a graph, or any suitable format. In an embodiment, processor 108 may be further configured to receive one or more requests for additional information from an entity 132 through user interface 140 or through another method.

With continued reference to FIG. 1, processor 108 may be further configured to receive a parameter constraint from the entity through the user interface. A "parameter constraint" is defined as an indication that a parameter is fixed or limited in how it may be changed. This may require that the processor 108 regenerate one or more of optimized part data 144, optimized part model 152, one or more toolpaths including first toolpath and optimized toolpath 148, and/or quote 156 based on the parameter constraint. For example, upon presentation of information to entity 132 through the user interface 140, the entity 132 may notice that an updated tolerance has been loosened too much and would not allow for a press fit of another mated part. Entity 132 may provide an indication through user interface 140 or another means that the updated tolerance has been loosened too much, and processor 108 may subsequently regenerate outputs 164 including quote 156 with the new tolerance constraints. Entity 132 may accept or reject the quote 156 through user interface 140.

With continued reference to FIG. 1, user interface 140 may be a computing device with display, such as a desktop or laptop computer, smartphone, tablet, wearable, smart watch or another computing device in accordance with the present disclosure. In an embodiment, user interface 140 may comprise a speaker and/or microphone. In an embodiment, user interface 140 may comprise a touch screen or digital writing device. User interface 140 may comprise one or more means for receiving user input such as a keyboard, mouse, button, touchscreen, knob, dial, slider, switch, or the like. User interface 140 may comprise one or more means for providing output such as a display, speaker, vibrating motor (such as the type for vibrating smartphones), LED, light, buzzer, alarm, or the like. In an embodiment, user interface 140 may comprise an e-reader. User interface 140 may comprise an internet interface. User interface 140 may include, without limitation, a transmission of communication with at least a computing device; transmission may include any transmission as described herein. A user interface 140 may include an additional computing device, such as a mobile device, laptop, desktop computer, or the like. Persons skilled in the art, upon reviewing the entirety of this disclosure, will be aware of various devices which may be suitable for use as user interface 140 consistent with this disclosure.

With continued reference to FIG. 1, processor 108 is configured to transmit a recommended parameter modification to user interface 140 indicating to a user how to select at least one parameter of the part data 128 such that at least one corresponding manufacturability datum 136 and quote 156 would be improved. For example, after receiving part data 128 and calculating outputs 164, processor 108 may send entity 132 information illustrating why a particular tolerance datum was changed and how the change affected quote 156. If a user selected a feature such as a through hole to have a tolerance that would allow for an interference fit, but the part that would interface with the through hole only required a clearance fit, then a much looser tolerance for the through hole could be chosen. Selection of a looser tolerance may allow for decreased production time and overall part cost, which would in turn improve manufacturability datum 136. This information may be presented to entity 132 through user interface 140. This may allow a user to be given feedback or otherwise "trained" using user interface 140. In an embodiment, information transmitted to entity 132 indicating how to select at least one parameter of the part data 128 such that at least one corresponding manufacturability datum 136 would be improved may comprise a message, visual information (e.g. an image or moving picture), audible information, a color or color coding of presented information, a number, a list, a printout, a file, a table, a graph, or any suitable datum communicating the desired information to entity 132.

With continued reference to FIG. 1, processor 108 may use an event handler to handle a user response to recommended parameter modification through user interface 140. An "event handler," as used in this disclosure, is a module, data structure, function, and/or routine that performs an action on remote device in response to a user interaction with event handler graphic. As used in this disclosure, an "event handler graphic" is a graphical element with which a user of user interface 140 may interact to enter data, for instance and without limitation for a search query or the like as described in further detail below. An event handler graphic may include, without limitation, a button, a link, a checkbox, a text entry box and/or window, a drop-down list, a slider, or any other user interaction graphical object that may occur to a person skilled in the art upon reviewing the entirety of this disclosure. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. Event handler may convert data into expected and/or desired formats, for instance such as date formats, currency entry formats, name formats, or the like.

With continued reference to FIG. 1, an event handler may include a cross-session state variable. As used herein, a "cross-session state variable" is a variable recording data entered on remote device during a previous session. Such data may include, for instance, previously entered text, previous selections of one or more elements as described above, or the like. For instance, cross-session state variable data may represent a search a user entered in a past session. Cross-session state variable may be saved using any suitable storage, including storage 120 or memory 112. For instance, data may be saved wholly or in part as a "cookie" which may include data or an identification of remote device to prompt provision of cross-session state variable by processor 108, which may store the data on memory 112 or storage 120. Alternatively, or additionally, processor 108 may use login credentials, device identifier, and/or device fingerprint data to retrieve cross-session state variable, which processor 108 may transmit to remote device. Cross-session state variable may include at least a prior session datum. A "prior session datum" may include any element of data that may be stored in a cross-session state variable. An event handler graphic may be further configured to display the at least a prior session datum, for instance and without limitation auto-populating user query data from previous sessions.

With continued reference to FIG. 1, information transmitted to user interface 140 indicating to a user how to select at least one parameter of the part data 128 such that at least one corresponding manufacturability datum 136 would be improved may be generated using machine learning. Machine learning module 116 may generate information for entity 168 such as a message, visual information (e.g. an image or moving picture), audible information, a color or color coding of presented information, a number, a list, a printout, a file, a table, a graph, or any suitable datum communicating the desired information to entity 132 based on training inputs provided to a machine learning algorithm on machine learning module 116. For example, training inputs may comprise data indicating a series of parts to be manufactured submitted by a user and various modalities of communicating changes to the user about how to choose parameters for the submitted parts. The data may indicate that over time a user made increasingly optimal choices when the information regarding changes to user-chosen parameters was presented in a particular way, such as through visual illustration rather than audible information. The machine learning module 116 could then weight a visual illustration modality more heavily than an audible information modality and thereby improve the efficacy of communicating changes to part data 128 to the user.

With continued reference to FIG. 1, processor 108 is configured to include one or more rationales 172 in the information transmitted to the user interface 140 indicating to entity 132 how and/or why to select at least one parameter of the part model such that at least one corresponding manufacturability datum 136 would be increased. Processor 108 may be further configured to include one or more rationales 172 in quote 156 indicating how optimized part data 144 was created. In an embodiment, rationale 172 may be included. In an embodiment, processor 108 may indicate that a particular tolerance is not possible given the selection of material for the part 124. For example, if an entity submits a part 124 and indicates the part is to be made out of foam, the porosity and roughness of foam may preclude a tolerance below a threshold, for example ±0.005 mm. If a user submits part data 128 with tolerance datum indicating a tolerance of ±0.001 mm, the information transmitted to the user interface 140 may include a message informing the entity 132 that tolerance datum has been loosened because of the inherent properties of the foam material selection. This may provide the user with educational feedback to allow them to make improved engineering and design decisions in future manufacturing requests. In an embodiment, a rationale may be presented as a message, visual information (e.g. an image or moving picture), audible information, a color or color coding of presented information, a number, a list, a printout, a file, a table, a graph, or any suitable datum communicating the desired information to entity 132. Exemplary rationales may include an engineering rationale, a design rationale, a material rationale, a manufacturing method rationale, a logical rationale, a price or cost rationale, a material availability rationale, an economic rationale, a supply chain rationale, a machinability rationale, a manufacturability rationale, a labor requirement rationale, a mathematical rationale, a geometrical rationale, a time rationale, or any other suitable rationale.

With continued reference to FIG. 1, the processor 108 may dynamically correlate a first user-submitted design parameter with a previously existing improvement to a second design parameter. "Dynamically" as used herein is defined as being in response to an interaction between processor 108 and entity 132. "Previously existing," as used herein, is defined as existing prior to the submission of the first user-submitted design parameter. "A first user-submitted design parameter" is a datum related to a design submitted by the user, and may include one or more descriptive attributes including any features, limitations, details, restrictions, specifications, part geometry, material, finish, connections, hardware, special processes, dimensions, tolerances, manufacturing methods, tools, tooling requirements, lead time, throughput, part features, part volume, part area, part weight, representative part model, format of part model, print, 2D representation, 3D representation, type or types of fits, surfaces, edges, openings, shapes, computer files, CAD drawings, computer-aided machining (CAM) files, and the like. The processor 108 may correlate such a parameter with a previously existing improvement to a design parameter, for example by correlating that changing a design parameter of the same type as the first user-submitted design parameter has previously led to an improvement in a second design parameter. Second design parameter may be of the same type or a similar type to any of the above-listed first user-submitted design parameters. Second design parameter may be a modification of the first user-submitted design parameter. For example, a first user-submitted design parameter may be a tolerance. Processor 108 may dynamically determine that altering a tolerance in a previous part lead to an improvement in manufacturing time for a similar part. Processor 108 and/or machine learning module 116 may utilize a machine learning classifier in accordance with the disclosure to classify the first user-submitted design parameter. For example, a classifier may be configured to output at least a datum that labels or otherwise identifies a set of data that are clustered together, found to be close under a distance metric as described below, or the like. Machine-learning module 116 may generate a classifier using a classification algorithm, defined as a process whereby a computing device and/or any module and/or component operating thereon derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, processor 108 and/or machine learning module 116 may classify elements of training data into different machining methods, such as milling, turning, electrical discharge machining, water jet, drilling, and so on. Processor 108 and/or machine learning module 116 may further classify machining methods based on smallest possible tolerances, such as machining methods capable of reaching ±0.01 mm, machining methods capable of reaching ±0.001 mm, machining methods capable of reaching ±0.0001 mm, etc. Processor 108 and/or machine learning module 116 may classify elements of training data based on parts made of the same or similar materials, parts occupying a similar total volume, parts with the same or similar largest and smallest dimensions, parts with an overall cost similar to an estimated cost of the part 124, parts made to perform the same or similar function as part 124, parts made for the same entity or user as part 124, parts created using a particular machining method or group of machining methods, or any suitable selection criteria. Processor 108 may retrieve data corresponding to second design parameter and existing improvements to second design parameters from storage 120, memory 112, machine learning module 116, or any suitable source.

With continued reference to FIG. 1, once the first user-submitted design parameter is classified, processor 108 and/or machine learning module 116 may correlate the first user-submitted design parameter with a previously existing improvement to a second design parameter. This may be performed by processor 108 and/or machine learning module 116. Correlating a first user-submitted design parameter with a previously existing improvement to a second design parameter may include determining that changing a parameter of the same type as the first user-submitted design parameter has previously led to an improvement of a second design parameter. For instance, the first user-submitted design parameter may be a tolerance. Processor 108 may correlate that the second design parameter of cost related to a previously existing part similar to part 124 had been improved by increasing tolerances. Parameters may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories.

With continued reference to FIG. 1, the processor 108 is configured to initiate manufacturing of a part, for example part 124. In an embodiment, the processor 108 may initiate manufacturing by facing or sizing a material stock in an automated CNC machine. In an embodiment, the processor 108 may initiate manufacturing by purchasing material that the part 124 is to be made from. In an embodiment, the processor 108 may initiate manufacturing by confirming to the entity 132 that manufacturing may proceed. In an embodiment, the processor 108 may initiate manufacturing by transmitting one or more outputs 164 to a computing device within a manufacturing facility, machine shop, or elsewhere, indicating that manufacturing of the part may occur. In an embodiment, the processor 108 may initiate manufacturing by scheduling use of one or more machines for the part 124.

Figure 2:
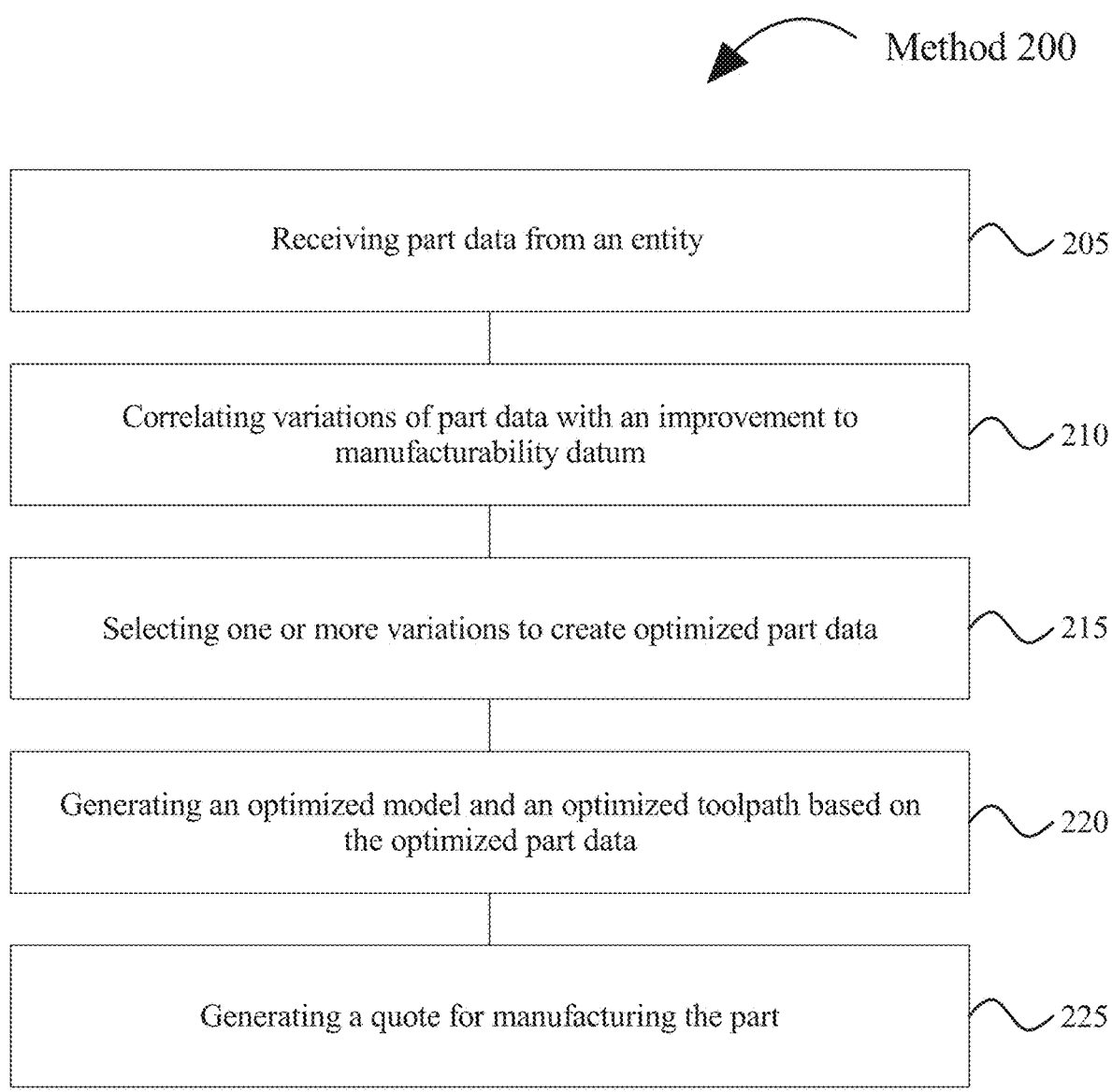
FIG. 2 illustrates particular implementations of various steps of a method of generating a manufacturing quote.

Referring now to FIG. 2, an exemplary method 200 for generating a manufacturing quote is illustrated. Method 200 comprises steps 205-225 and may be performed using some or all of the elements described in apparatus 100 of FIG. 1. At step 205, a processor receives part data from an entity, the part data corresponding to a part. At step 210, the processor correlates one or more variations of the part data with an improvement to a manufacturability datum. At step 215, the processor selects at least one of the one or more variations of the part data based on the manufacturability datum to create optimized part data. At step 220, the processor generates an optimized model of the part based on the optimized part data and an optimized toolpath based on the optimized part data, wherein the optimized toolpath corresponds to a first tool used to manufacture the part. At step 225, the processor generates a quote for manufacturing of the part based on the optimized toolpath, wherein the quote includes a time of receipt of the manufactured part.

Continuing to refer to FIG. 2, at step 205 a processor receives part data from an entity, the part data corresponding to a part. This step may be implemented in accordance with an apparatus 100 and steps performed in accordance with FIG. 1.

Continuing to refer to FIG. 2, at step 210 the processor correlates one or more variations of the part data with an improvement to a manufacturability datum. This step may be implemented in accordance with an apparatus 100 and steps performed in accordance with FIG. 1.

Continuing to refer to FIG. 2, at step 215 the processor selects at least one of the one or more variations of the part data based on the manufacturability datum to create optimized part data. This step may be implemented in accordance with an apparatus 100 and steps performed in accordance with FIG. 1.

Continuing to refer to FIG. 2, at step 220 the processor generates an optimized model of the part based on the optimized part data and an optimized toolpath based on the optimized part data, wherein the optimized toolpath corresponds to a first tool used to manufacture the part. This step may be implemented in accordance with an apparatus 100 and steps performed in accordance with FIG. 1.

Continuing to refer to FIG. 2, at step 225 the processor generates a quote for manufacturing of the part based on the optimized toolpath, wherein the quote includes a time of receipt of the manufactured part. This step may be implemented in accordance with an apparatus 100 and steps performed in accordance with FIG. 1.

Figure 3:
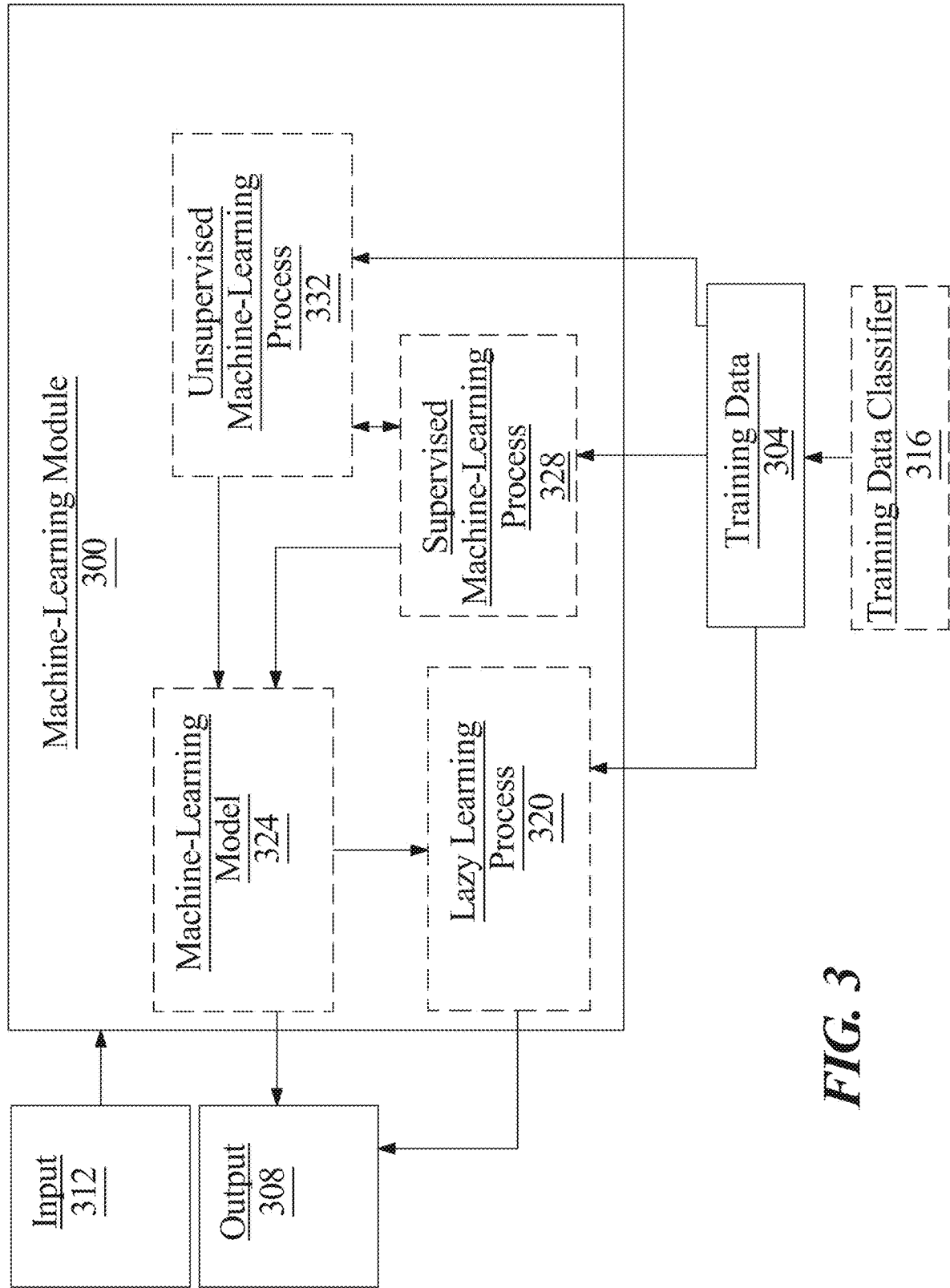
FIG. 3 is a block diagram of a machine learning module.

Referring now to FIG. 3, an exemplary embodiment of a machine learning module 400 is described in detail. With reference to FIG. 1, machine learning module 116 may be identical or similar to machine learning module 300 in FIG. 3. Machine learning module 300 may be either a software module stored on memory 112, storage 120, or a separate storage device; or machine learning module 300 may be a separate hardware module as part of computing device 104. In an embodiment, machine learning module 300 may comprise separate non-volatile storage such as a hard disk, solid state drive, or cloud storage. Machine learning module 300 may be communicatively coupled with storage 120 and retrieve data from storage 120, while running computations on machine learning module 300. Machine learning module 300 may be programmed with one or more machine learning algorithms as outlined below.

Still referring to FIG. 3, an exemplary embodiment of a machine-learning module 300 that may perform one or more machine-learning processes as described in this disclosure is illustrated. Machine-learning module 300 may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Still referring to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example training data 304 may correlate tolerance values with manufacturability. Machine learning module 300 may correlate larger tolerances with cheaper and more quickly manufactured parts or may associate certain manufacturing methods with machining times that are independent of selected tolerance throughout the possible range of tolerances.

Still referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data into different machining methods, such as milling, turning, electrical discharge machining, water jet, drilling, and so on. Training data classifier 316 may further classify machining methods based on smallest possible tolerances, such as machining methods capable of reaching ±0.01 mm, machining methods capable of reaching ±0.001 mm, machining methods capable of reaching ±0.0001 mm, etc. Training data classifier 316 may classify elements of training data based on parts made of the same or similar materials, parts occupying a similar total volume, parts with the same or similar largest and smallest dimensions, parts with an overall cost similar to an estimated cost of the part 124, parts made to perform the same or similar function as part 124, parts made for the same entity or user as part 124, parts created using a particular machining method or group of machining methods, or any suitable selection criteria.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Still referring to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created through the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Still referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Still referring to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 4:
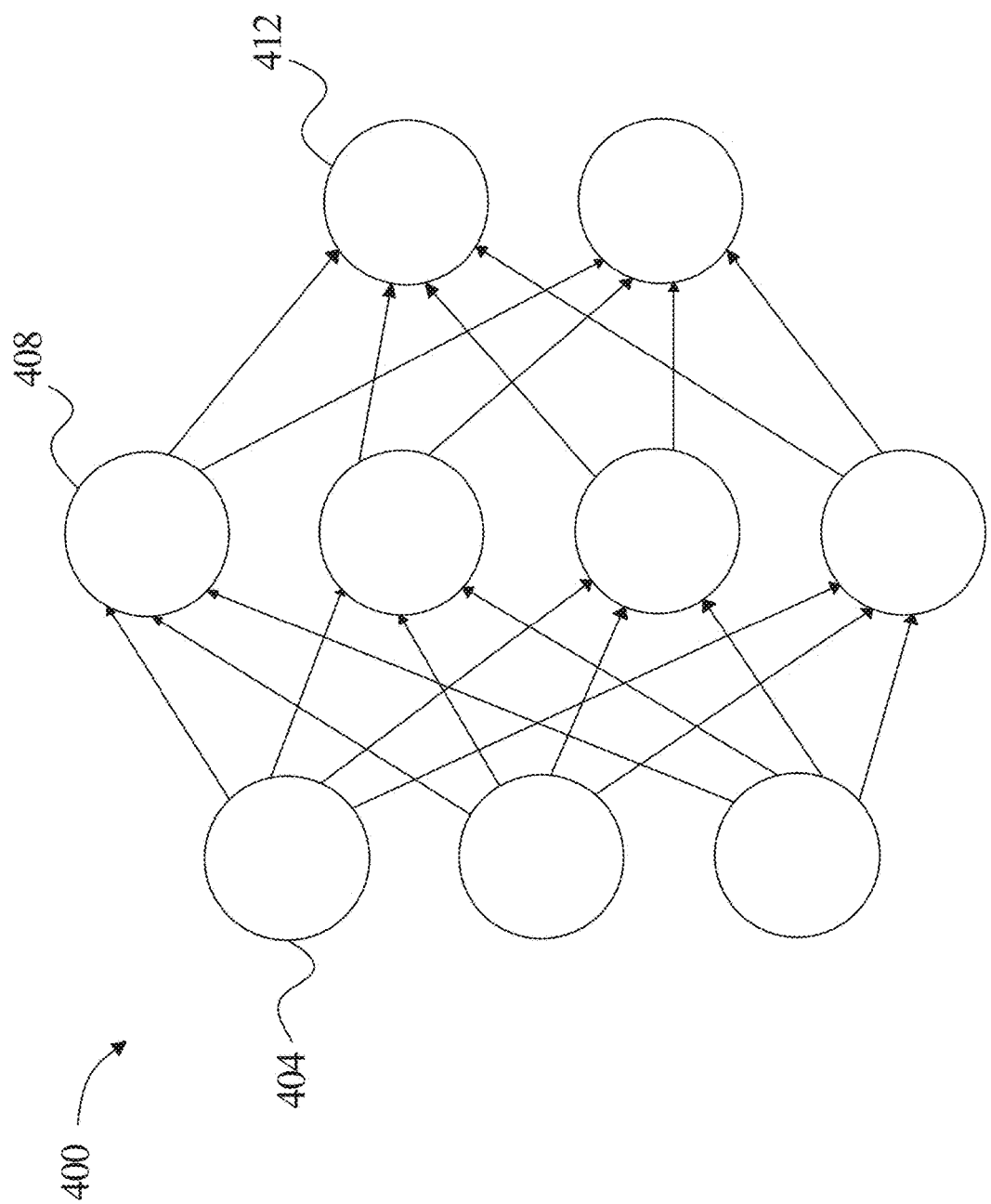
FIG. 4 is a diagram illustrating a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created through the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
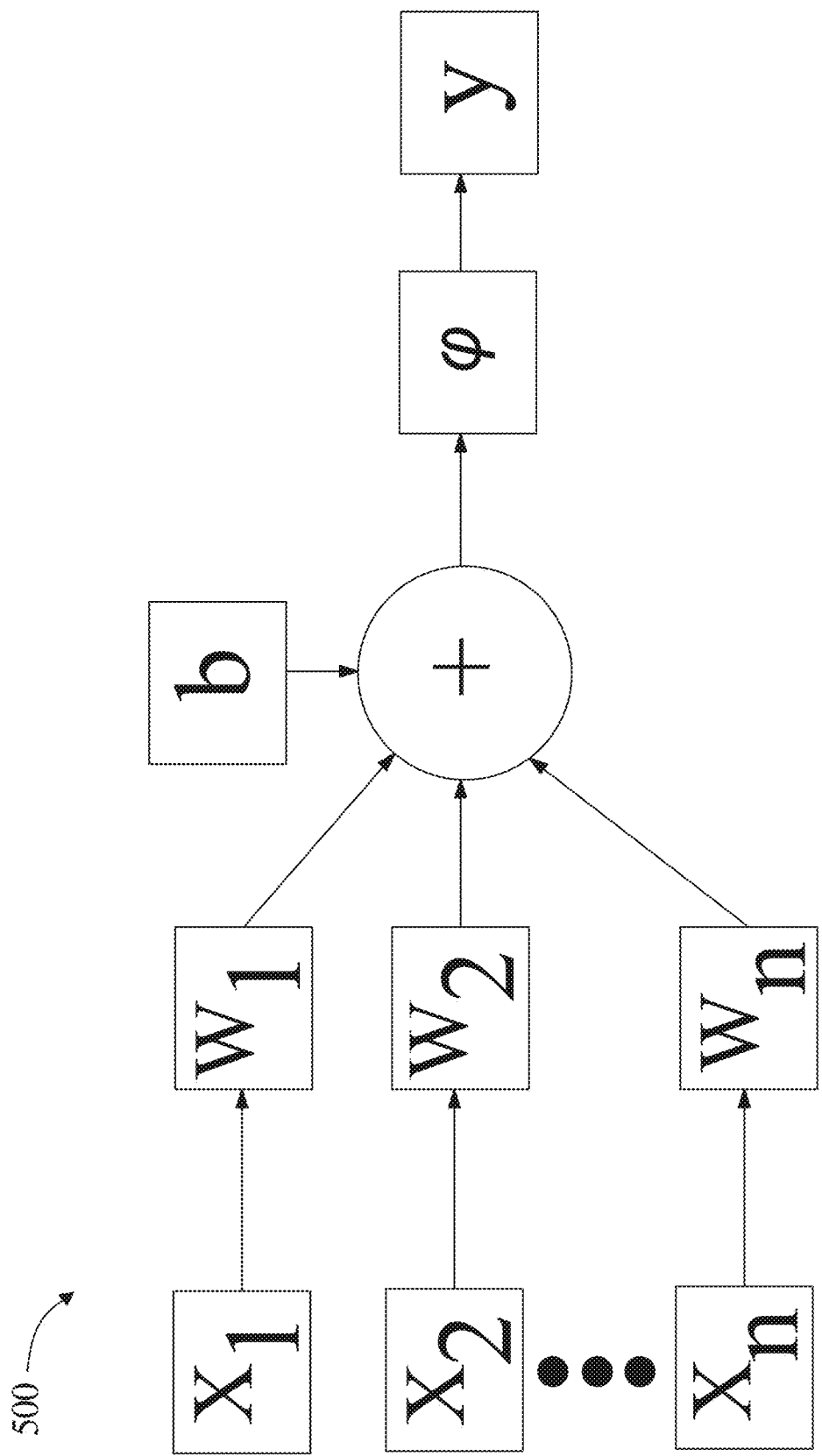
FIG. 5 is a diagram illustrating a node of a neural network.

Referring now to FIG. 5, an exemplary embodiment of a node 500 of a neural network is illustrated. A node may include, without limitation a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $f(x)=1/1-e^{-x}$ given input x, a tanh (hyperbolic tangent) function, of the form $e^x-e^{-x}/e^x+e^{-x}$, a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $f(x)=\{{}^{x\ for\ x\geq 0}_{\alpha(e^x-1)\ for\ x>0}$ for some value of a (this function may be replaced and/or weighted by its own derivative in some embodiments), a softmax function such as $f(x_i)=e^x/\Sigma_i x_i$ where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $f(x)=\lambda\{{}^{x\ for\ x\geq 0}_{\alpha(e^x-1)\ for\ x<0}$. Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
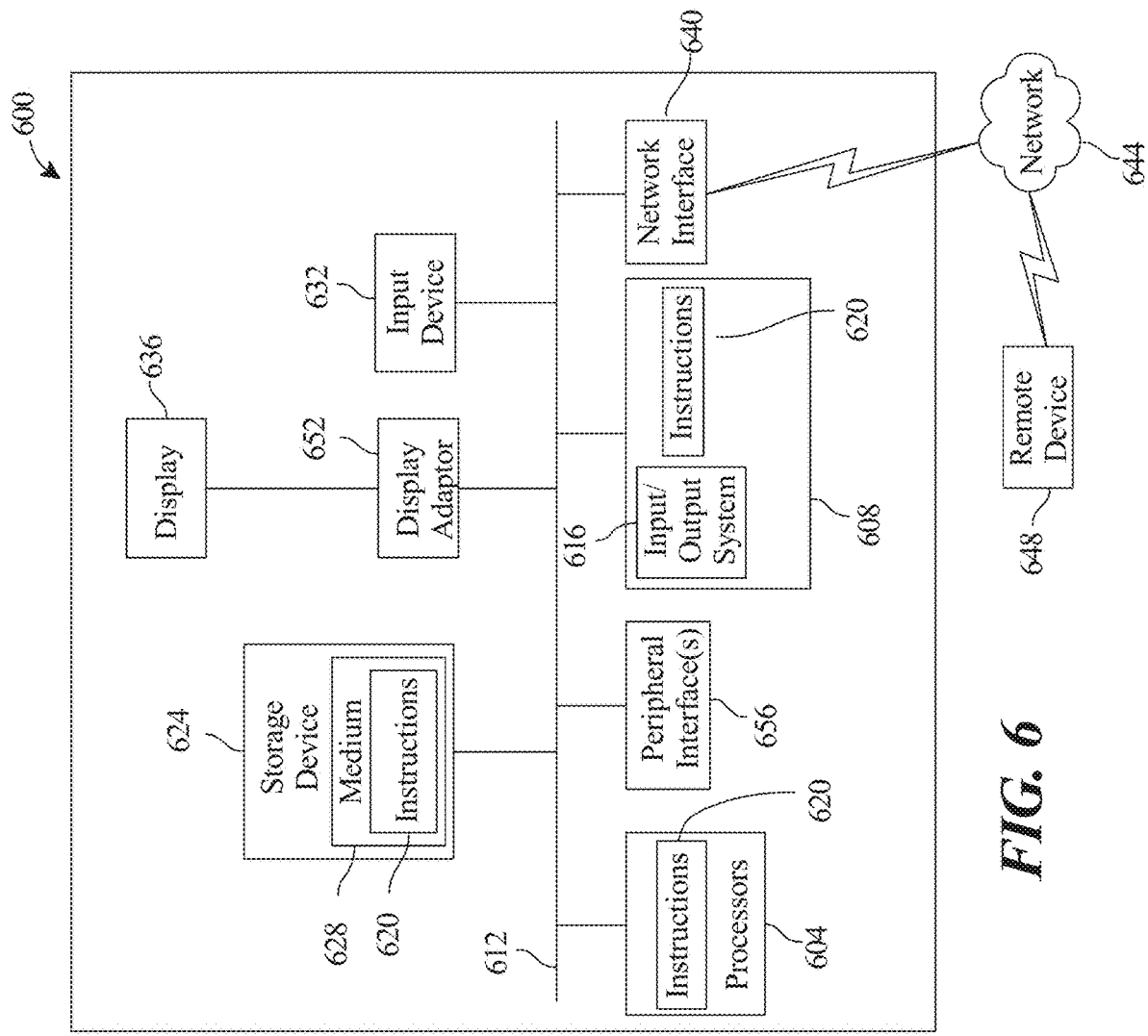
FIG. 6 is a block diagram of a computing system that can be used to implement any one or more of the methodologies disclosed herein and any one or more portions thereof.

Referring now to FIG. 6, a diagrammatic representation is illustrated of an embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, through a bus 612. Bus 612 may include any of several types of bus structures including, but not limited to, a memory bus, a memory controller, a peripheral bus, a local bus, and any combinations thereof, using any of a variety of bus architectures.

With further reference to FIG. 6, processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

With further reference to FIG. 6, memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

With further reference to FIG. 6, computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

With further reference to FIG. 6, computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

With further reference to FIG. 6, a user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

With further reference to FIG. 6, computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

If not sufficiently clear from contextual or plain and ordinary usage, the terms "about," "around," "approximately," and "substantially," when used to modify a value, number, figure, quantity, or other term, can be understood to mean ±20% of the modified value, inclusive. For instance, if not sufficiently clear from contextual or plain and ordinary usage, "about 10" can be understood to mean "from 8 to 12 inclusive". If not sufficiently clear from contextual or plain and ordinary usage, the term "relatively" is used to indicate that one of ordinary skill in the art would more closely associate the described value or modifier with the term it modifies (such as high) than another term in a similar class of words (such as low or medium). For instance, if a temperature is described as being "relatively high," one of ordinary skill in the art would more closely associate said temperature with "high" temperatures than "medium" or "low" temperatures. In another example, if a tire pressure between 30-33 psi is considered "standard," then the term "relatively low pressure" would indicate that the stated pressure would be more readily identified by one of ordinary skill in the art as being "low" than being "standard;" for instance, 26 psi.

As used herein, "and/or" is meant to capture all possible permutations of "and" and "or". "And/or" may indicate every element of a specified grouping, combinations of less than all elements, or one element. For example, A, B, and/or C can mean any single one of A, B, or C; A and B but not C, B and C but not A, A and C but not B; and A, B, and C together.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a manufacturing quote, the apparatus comprising:
   a processor; and
   a memory, wherein the memory contains instructions configuring the processor to:
   receive part data from an entity, the part data corresponding to a part;
   correlate one or more variations of the part data with an improvement to a manufacturability datum;
   select at least one of the one or more variations of the part data based on the manufacturability datum to create optimized part data;
   generate an optimized model of the part based on the optimized part data and an optimized toolpath based on the optimized part data, wherein the optimized toolpath corresponds to a first tool used to manufacture the part, wherein generating the optimized model comprises generating the optimized part data using an optimized part data machine learning model trained iteratively on correlations between the part data and the manufacturability datum, wherein the optimized part data is created by generating a first toolpath, and wherein the first toolpath is generated by training a toolpath machine learning model based on toolpath training data;
   generate a classifier as a function of the toolpath training data using the toolpath machine learning model;
   generate a quote for manufacturing of the part based on the toolpath training data and the optimized model, wherein the quote includes a time of receipt of the manufactured part, and wherein generating the quote for manufacturing comprises calculating the time of receipt based on market milling minutes.

2. The apparatus of claim 1, wherein the quote comprises a rationale related to how the optimized part data was created.

3. The apparatus of claim 1, wherein the processor is further configured to generate the optimized toolpath based on a removal rate.

4. The apparatus of claim 3, wherein the removal rate is one of a material removal rate and an area removal rate.

5. The apparatus of claim 1, wherein generating the optimized model and optimized toolpath comprises generating the optimized part data automatically using a machine learning model trained on correlations between part data and manufacturability datum.

6. The apparatus of claim 1, wherein the time of receipt comprises a shipping time.

7. The apparatus of claim 1, wherein the processor is further configured to transmit the quote to a user interface.

8. The apparatus of claim 7, wherein the processor is further configured to modify the quote based on input received though the user interface.

9. The apparatus of claim 7, wherein the processor is further configured to receive a parameter constraint from the entity through the user interface.

10. A method for generating a manufacturing quote, the method comprising:
   receiving, by a processor, part data from an entity, the part data corresponding to a part;
   correlating, by the processor, one or more variations of the part data with an improvement to a manufacturability datum;
   selecting, by the processor, at least one of the one or more variations of the part data based on the manufacturability datum to create optimized part data;
   generating, by the processor, an optimized model of the part based on the optimized part data and an optimized toolpath based on the optimized part data, wherein the optimized toolpath corresponds to a first tool used to manufacture the part, wherein generating the optimized model comprises generating the optimized part data using an optimized part data machine learning model trained iteratively on correlations between the part data and the manufacturability datum, wherein the optimized part data is created by generating a first toolpath, and wherein the first toolpath is generated by training a toolpath machine learning model based on toolpath training data;

generating, by the processor, a classifier as a function of the toolpath training data using the toolpath machine learning model;

generating, by the processor, a quote for manufacturing of the part based on the toolpath training data and optimized model, wherein the quote includes a time of receipt of the manufactured part, and wherein generating the quote for manufacturing comprises calculating the time of receipt based on market milling minutes.

11. The method of claim 10, wherein the quote includes a rationale related to how the optimized part data was created.

12. The method of claim 10, further comprising generating, by the processor, the optimized toolpath based on a removal rate.

13. The method of claim 12, wherein the removal rate is one of a material removal rate and an area removal rate.

14. The method of claim 10, further comprising automatically generating, by the processor, the optimized part data using a machine learning model trained on correlations between part data and manufacturability datum.

15. The method of claim 10, wherein the time of receipt comprises a shipping time.

16. The method of claim 10, further comprising transmitting, by the processor, the quote to a user interface.

17. The method of claim 16, further comprising modifying, by the processor, the quote based on input received through the user interface.

18. The method of claim 16, further comprising receiving, by the processor, a parameter constraint from the entity through the user interface.

* * * * *